US008243042B2

(12) United States Patent
Touyamasaki

(10) Patent No.: US 8,243,042 B2
(45) Date of Patent: Aug. 14, 2012

(54) OPERATION DEVICE AND IMAGE FORMATION DEVICE

(75) Inventor: Kenta Touyamasaki, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/426,841

(22) Filed: Mar. 22, 2012

(65) Prior Publication Data

US 2012/0176334 A1 Jul. 12, 2012

Related U.S. Application Data

(62) Division of application No. 12/104,061, filed on Apr. 16, 2008.

(30) Foreign Application Priority Data

| | | | |
|---|---|---|---|
| Apr. 18, 2007 | (JP) | ................................ | 2007-109146 |
| May 24, 2007 | (JP) | ................................ | 2007-137714 |
| Jul. 25, 2007 | (JP) | ................................ | 2007-193416 |
| Jul. 25, 2007 | (JP) | ................................ | 2007-193417 |

(51) Int. Cl.
*G06F 3/041* (2006.01)

(52) U.S. Cl. .................. 345/173; 178/18.01; 178/18.02

(58) Field of Classification Search .......... 345/173–184; 178/18.01–20.04
See application file for complete search history.

(56) References Cited

U.S. PATENT DOCUMENTS

| | | | | |
|---|---|---|---|---|
| 7,551,870 | B2 | 6/2009 | Sato ................................ | 399/81 |
| 7,942,743 | B2 * | 5/2011 | Tahara et al. .................... | 463/36 |
| 2004/0021643 | A1 | 2/2004 | Hoshino et al. ............... | 345/173 |
| 2004/0061687 | A1 * | 4/2004 | Kent et al. ...................... | 345/173 |
| 2004/0081479 | A1 | 4/2004 | Kobayashi et al. ............ | 399/80 |
| 2005/0227762 | A1 | 10/2005 | Tahara et al. .................... | 463/30 |
| 2005/0259087 | A1 | 11/2005 | Hoshino et al. ............... | 345/173 |
| 2006/0161846 | A1 * | 7/2006 | Van Leeuwen .............. | 715/702 |

FOREIGN PATENT DOCUMENTS

| | | |
|---|---|---|
| JP | 2002-361968 | 12/2002 |
| JP | 2003-323084 | 11/2003 |

OTHER PUBLICATIONS

Office Action dated Apr. 16, 2012 issued in corresponding U.S. Appl. No. 13/426,913.

* cited by examiner

*Primary Examiner* — Amare Mengistu
*Assistant Examiner* — Dmitriy Bolotin
(74) *Attorney, Agent, or Firm* — Ostrolenk Faber LLP

(57) ABSTRACT

An operation device includes: a touch panel on which at least one operation button is displayed; a press position detection unit detecting a press position when a user presses the touch panel; a button operation detection unit determining whether an operation is applied to the operation button based on the press position; a button operation appropriateness determination unit determining whether a button operation by the user is appropriate; and a button operation facilitating unit facilitating subsequent button operations by the user when it is determined by the button operation appropriateness determination unit that the button operation by the user is inappropriate.

9 Claims, 25 Drawing Sheets

OPERATION DEVICE AND IMAGE FORMATION DEVICE

CLAIM OF PRIORITY AND RELATED APPLICATIONS

This is a divisional of U.S. patent application Ser. No. 12/104,061, filed Apr. 16, 2008 in the name of Kenta TOUYAMASAKI, which application claims benefit and priority of Japanese Patent Application No. 207-109146 filed Apr. 18, 2007, Japanese Patent Application No. 2007-137714 filed May 24, 2007, Japanese Patent Application No. 2007-193416 filed Jul. 25, 2007, and Japanese Patent Application No. 2007-193417 filed Jul. 25, 2007, the entire content of which is incorporated herein by reference.

BACKGROUND OF THE INVENTION

1. Field of the Invention

The present invention relates to an operation device and an image formation device.

2. Description of Related Art

An image formation device such as a copier and facsimile machine includes an operation device as a man-machine interface, and an image formation device is known in which a touch panel, as an example of such an operation device, is used.

As is well known, a touch panel is an operation device having a display function as well as an operation function, in which operation buttons are displayed as an image, and operation position (touch position or press position) by a user is detected by using press sensors provided with the display face.

For example, Japanese Unexamined Patent Application, First Publication No. 2002-361968 (Patent document 1) and Japanese Unexamined Patent Application, First Publication No. 2003-323084 (Patent document 2) disclose an image formation device having such a touch panel in which the operation face (display face) of the touch panel (operation device) is provided with an angle adjustment function. The angle adjustment function enables the inclination angle of the touch panel to be adjusted in order to provide a comfortable operation condition for the operation device.

A user who uses the image formation device disclosed in Patent documents 1 and 2 for the first time may not fully utilize the angle adjustment function, and may continue the operation while the operation face is set at an inappropriate angle, which may lead to a misoperation. Misoperations to the touch panel include a misoperation due to finger actions despite of a correct visual recognition by the user, a misoperation due to a visual mis-recognition of the operation buttons, etc. Accordingly, in order to make an angle adjustment function for a touch panel more practical, development of technology is highly demanded by which a user can always use a touch panel while the inclination angle of the touch panel is set at an optimal angle.

Moreover, in the case of an image formation device whose operation device is set at a height of waist of a standing user of an average height, the operation by a user of small height or a user sitting in a wheelchair is facilitated if the inclination angle of the touch panel is set at a large value; however, a user of large height tends to press at positions shifted upward from a position aimed by the user if the inclination angle of the touch panel is maintained at the large value.

Furthermore, in the case of a touch panel in which displayed operation buttons are miniaturized or disposed in a complicated manner, a user may unintentionally touch an operation button displayed at a position next to the operation button to be pressed because the gaps between the operation buttons are small. A user who uses the image formation device disclosed in Patent documents 1 and 2 for the first time may continue to operate the touch panel while the operation face is set at an inappropriate angle, which may further increase occurrence of the aforementioned misoperations. Because when the inclination angle of the touch panel is set at a large value, the operation by a user of small height or a user sitting in a wheelchair is facilitated; however, a user of standard height unconsciously tends to press at positions shifted upward. On the other hand, when the inclination angle of the touch panel is set at a small value, the operation by a user of standard is facilitated; however, a user of small height unconsciously tends to press at positions shifted downward.

In view of these circumstances, in order to prevent misoperations by a user as much as possible, development of technology is highly demanded by which operations intended by a user can be facilitated. In particular, in order to make the angle adjustment means for a touch panel more practical, it is essential to develop a technology by which the touch operations by a user are facilitated even when the touch panel is used at an inappropriate angle.

SUMMARY OF THE INVENTION

The present invention was made in view of the above circumstances, and an object thereof is to provide an operation device which can reduce misoperations of operations buttons by a user, and more specifically, (1) to provide an operation device which enables a user to always operate the operation device while the operation face thereof is set an appropriate angle, (2) to provide an operation device which increases reliability of acceptance of the operations intended by a user even when the inclination angle of the touch panel is not set at an appropriate value, (3) to provide an operation device which prevents misoperations by rationally determining the operation buttons aimed by a user and by displaying the operation buttons on the touch panel, and (4) to provide an operation device which facilitates the touch operations of a user so that misoperations can be prevented by correcting detected values of a touch position.

Another object of the present invention is to provide an image formation device which can reduce misoperations of operations buttons by a user.

In order to achieve the above object, the present invention provides, as a first aspect, an operation device including: a touch panel on which at least one operation button is displayed; a press position detection unit detecting a press position when a user presses the touch panel; a button operation detection unit determining whether an operation is applied to the operation button based on the press position; a button operation appropriateness determination unit determining whether a button operation by the user is appropriate; and a button operation facilitating unit facilitating subsequent button operations by the user when it is determined by the button operation appropriateness determination unit that the button operation by the user is inappropriate.

In the operation device of the first aspect, an inclination angle of the touch panel may be adjustable, the button operation appropriateness determination unit may determine whether the button operation by the user is appropriate by comparing a position of the operation button whose operation is detected by the button operation detection unit and the press position, and the button operation facilitating unit may urge the user to change the inclination angle of the touch panel when it is determined by the button operation appropriateness determination unit that the button operation by the user is inappropriate (a second aspect).

In the operation device of the second aspect, the button operation appropriateness determination unit may include an angle determination unit determining whether the inclination angle of the touch panel is appropriate depending on a ratio of the number of presses applied to an upper region disposed in an upper area of the operation button or to a lower region disposed in a lower area thereof with respect to a total number of presses applied to the touch panel.

In the operation device of the second aspect, the button operation appropriateness determination unit may count the number of presses applied to all of the operation buttons, and may include an angle determination unit determining whether the inclination angle of the touch panel is appropriate depending on whether the number of continuous presses applied to upper regions disposed in upper areas of the operation buttons or to lower regions disposed in lower areas thereof exceeds a predetermined threshold.

In the operation device of the second aspect, the button operation appropriateness determination unit may count the number of presses applied to one of the operation buttons, and may include an angle determination unit determining whether the inclination angle of the touch panel is appropriate depending on whether the number of continuous presses applied to an upper region disposed in an upper area of the operation button or to a lower region disposed in a lower area thereof exceeds a predetermined threshold.

In the operation device of the second aspect, the button operation facilitating unit may include an angle change urging unit displaying, on the touch panel, a message urging the user to change the inclination angle of the touch panel.

In the operation device of the first aspect, the touch panel may include: a display region which visually displays the operation button; and a recognition region which recognizes the button operation by the user, the button operation appropriateness determination unit may determine whether the button operation by the user is appropriate by comparing a position of the operation button whose operation is detected by the button operation detection unit and the press position, and the button operation facilitating unit may enlarge at least the recognition region among the display region and the recognition region when it is determined by the button operation appropriateness determination unit that the button operation by the user is inappropriate (a third aspect).

In the operation device of the third aspect, the button operation appropriateness determination unit may include a misoperation determination unit which defines, when the press position for the operation button tends to shift in a direction, the direction to be a shift direction, and determines that there are misoperations, and the button operation facilitating unit may include a button enlarging unit which enlarges at least the recognition region among the display region and the recognition region in the shift direction when it is determined by the misoperation determination unit that there are misoperations by the user.

In the operation device of the first aspect, the touch panel may include: a display region which visually displays the operation button; and a recognition region which recognizes the button operation by the user, the button operation appropriateness determination unit may determine whether the button operation by the user is appropriate by comparing a position of the operation button whose operation is detected by the button operation detection unit and the press position, and the button operation facilitating unit may shift at least the recognition region among the display region and the recognition region when it is determined by the button operation appropriateness determination unit that the button operation by the user is inappropriate (a fourth aspect).

In the operation device of the fourth aspect, the button operation appropriateness determination unit may include a misoperation determination unit which defines, when the press position for the operation button tends to shift in a direction, the direction to be a shift direction, and determines that there are misoperations, and the button operation facilitating unit may include a button shifting unit which shifts at least the recognition region among the display region and the recognition region in the shift direction when it is determined by the misoperation determination unit that there are misoperations by the user.

In the operation device of the third or fourth aspect, an inclination angle of the touch panel may be adjustable.

In the operation device of the first aspect, the button operation detection unit may include an operation counting unit which counts the number of repetitions of press operations applied to a first operation button which is one of the operation buttons and canceling operations canceling the press operations applied to the first operation button, the button operation appropriateness determination unit may determine that the button operation by the user is inappropriate when the number of repetitions counted by the operation counting unit reaches a predetermined number of repetitions, and the button operation facilitating unit may display, when it is determined by the button operation appropriateness determination unit that the button operation by the user is inappropriate, an auxiliary image including a third operation button which indicates an operation identical to that of the first operation button, and a fourth operation button which indicates an operation identical to that of at least one second operation button which is disposed next to the first operation button (a fifth aspect).

In the operation device of the fifth aspect, the button operation facilitating unit may include an auxiliary display determination unit which displays one of the second operation buttons that is disposed upper-next to or lower-next to the first operation button as the fourth operation button.

The auxiliary display determination unit may determine whether the auxiliary image is displayed depending on the press position within a press recognition region where the press operation applied to the first operation button is recognized, and on the number of repetitions.

Moreover, the auxiliary display determination unit may display one of the second operation buttons that is disposed upper-next to the first operation button as the fourth operation button when all of the press positions fall within an upper region disposed in an upper area of the press recognition region and/or the auxiliary display determination unit displays one of the second operation buttons that is disposed lower-next to the first operation button as the fourth operation button when all of the press positions fall within a lower region disposed in a lower area of the press recognition region.

In the operation device of the fifth aspect, the button operation facilitating unit may include an auxiliary display determination unit which displays the third operation button and the fourth operation button in a positional relationship which is different from that of the first operation button and the second operation button.

In the operation device of the fifth aspect, the button operation facilitating unit may include an angle adjusting unit which changes an inclination angle of the touch panel. In the operation device of the fifth aspect, the button operation facilitating unit may include: an angle adjusting unit which changes an inclination angle of the touch panel; an angle measuring unit which measures the inclination angle of the touch panel; and an auxiliary display determination unit which displays the auxiliary image depending on a measurement result of the angle measuring unit.

The auxiliary display determination unit may display one of the second operation buttons that is disposed upper-next to the first operation button as the fourth operation button when the inclination angle measured by the angle measuring unit is equal to or greater than a predetermined threshold.

Moreover, the auxiliary display determination unit may display one of the second operation buttons that is disposed lower-next to the first operation button as the fourth operation button when the inclination angle measured by the angle measuring unit is smaller than a predetermined threshold.

In the operation device of the first aspect, the touch panel may include: a display region which visually displays the operation button; and a recognition region which is wider than the display region and recognizes the button operation by the user, the button operation detection unit may determine whether an operation is applied to the operation button by determining whether the press position is within the recognition region, the button operation appropriateness determination unit may determine whether the button operation by the user is appropriate by comparing a position of the operation button whose operation is detected by the button operation detection unit and the press position, and defines a press position shift direction with respect to the display region depending on a frequency of press operations applied within the recognition region and out of the display region, the button operation facilitating unit may apply a predetermined correction value to a press position detection value that is obtained when a region shifted from the recognition region in the press position shift direction is pressed so that the press position detection value is corrected so as to fall within the recognition region of the operation button (a sixth aspect).

In the operation device of the sixth aspect, the button operation facilitating unit may include a detection value correction unit which applies the correction value to the press position detection value which falls within a region extending up to a display region of a next operation button located in the press position shift direction.

In the operation device of the sixth aspect, the button operation facilitating unit may include a detection value correction unit which corrects the press position detection value so as to fall within the display region.

In the operation device of the sixth aspect, the button operation facilitating unit may include an angle adjusting unit which changes an inclination angle of the touch panel. The present invention also provides an image formation device including the operation device of any one of the first to sixth aspects.

According to the present invention, when it is determined by the button operation appropriateness determination unit (the angle determination unit) that the inclination angle of the touch panel is inappropriate depending on the user's operation position to the operation buttons, the button operation facilitating unit (angle change urging unit) automatically urges the user to change the inclination angle of the touch panel; therefore, the user can recognize that the inclination angle of the touch panel is inappropriate, and thus the user can carry out the operation after adjusting the inclination angle of the touch panel to the optimal angle.

In other words, because the user can always operate the touch panel placed in a state in which the inclination angle thereof is adjusted to the optimal angle, misoperations can be significantly reduced, thereby comfortable operation conditions and improvement in the operability can be achieved.

According to the present invention, if a user has tendency to misoperate the operation buttons or to mis-recognize the position of operation buttons to be pressed when operating a touch panel, at least the recognition region among the display region and the recognition region of the operation button is enlarged; therefore, it is possible to increase confidence that an operation to a button that is allocated to a desired operation is accepted when the user presses the operation button.

In other words, even if the inclination angle of the touch panel is not optimal for a user, misoperations due to such inappropriateness can be significantly reduced; therefore, it is possible to increase confidence that an operation intended by the user is accepted, thereby comfortable operation conditions and improvement in operability can be achieved.

According to the present invention, the number of repetitions of press operations applied to a first operation button which is one of the operation buttons and canceling operations canceling the press operations applied to the first operation button is counted, and when the number of repetitions reaches a predetermined number of repetitions, a third operation button and a fourth operation button are displayed in an auxiliary image, where the third operation button indicates an operation identical to that of the first operation button, and the fourth operation button indicates an operation identical to that of an operation button which is disposed next to the first operation button.

Accordingly, because an operation button that is supposed to be aimed by the user is rationally recognized, and the particular operation button is displayed on the touch panel, the user can easily select the operation button, and thus misoperations can be prevented.

Furthermore, if the operation device is configured in such a manner that the third and fourth operation buttons are displayed in the auxiliary image depending on the position of the operation button to which a press operation has been applied and on the inclination angle of the touch panel, an operation button that is supposed to be aimed by the user is more rationally recognized; therefore, the user can correctly select the operation button that is supposed to be aimed with a high probability, and thus misoperations can be prevented.

Because a predetermined correction value is applied to a press position detection value that is obtained when a region shifted from the recognition region in the press position shift direction is pressed so that the press position detection value is corrected so as to fall within the recognition region of the operation button depending on a frequency of press operations applied within the recognition region and out of the display region, an aimed operation button can be operated even when a press operation is applied to, for example, a region between the recognition regions of operation buttons adjacent to each other.

Furthermore, because the button operation facilitating unit (the detection value correction unit) applies the correction value to the press position detection value which falls within a region extending up to a display region of a next operation button located in the press position shift direction, a region to which correction is to be applied can be expanded at the maximum. Accordingly, an operation button aimed by a user can be operated even when a press operation by the user is erroneously applied to a region in the vicinity of the display region of the adjacent operation button.

In addition, because the button operation facilitating unit (the detection value correction unit) corrects the press position detection value so as to fall within the display region, a press position detection value can be reliably obtained.

Moreover, if the button operation facilitating unit includes an angle adjusting unit which changes the inclination angle of the touch panel, and even if the inclination angle of the touch panel is not appropriate for a user, the press operation by the user is efficiently assisted so that misoperations are prevented because a correction is applied to the detection value of a press position out of the recognition region of an operation button aimed by the user.

Moreover, by proving the aforementioned operation device, an image can be comfortably operated because a user is assisted and misoperations can be prevented.

BRIEF DESCRIPTION OF THE DRAWINGS

FIG. 2A shows a default state, and FIG. 2B shows a down state.

FIG. 6A shows a default state, and FIG. 6B shows a down state.

FIG. 13A shows a default state, and FIG. 13B shows a down state.

FIGS. 17A, 17B, 17C, and 17D are diagrams showing set examples of the button recognition regions K and the like.

FIG. 22A shows a default state, and FIG. 22B shows a down state.

DETAILED DESCRIPTION OF THE INVENTION

A first embodiment of the present invention will be explained below with reference to the drawings.

Figure 1:
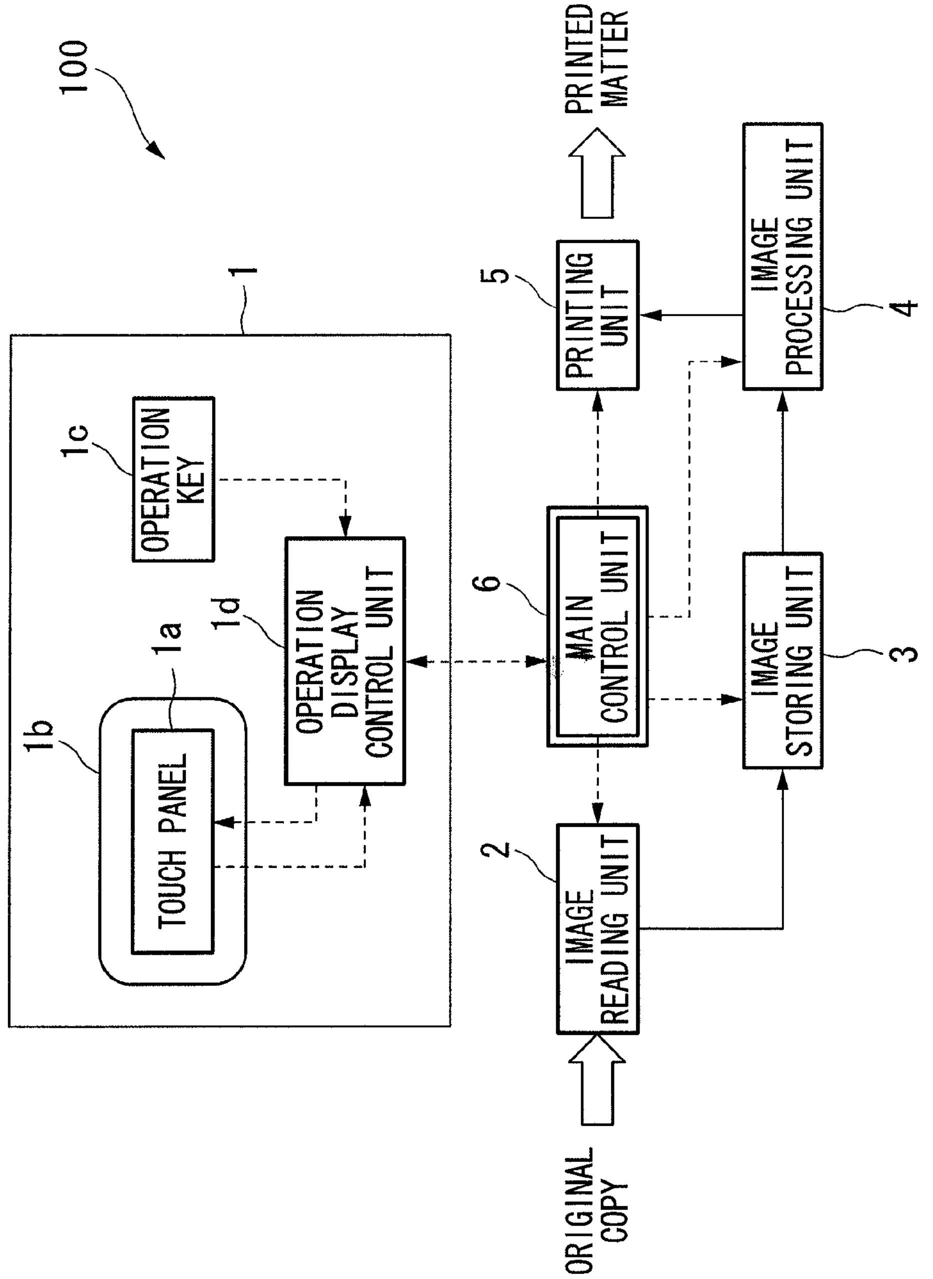
FIG. 1 is a block diagram showing a functional constitution of a copier 100 according to a first embodiment of the present invention.

FIG. 1 is a block diagram showing a functional constitution of a copier 100 according to the first embodiment. As shown in FIG. 1, the copier 100 includes an operation display unit 1, an image reading unit 2, an image storing unit 3, an image processing unit 4, a printing unit 5, and a main control unit 6.

As shown in the figure, the operation display unit 1 includes a touch panel 1*a*, a variable angle support mechanism 1*b*, an operation key 1*c*, and an operation display control unit 1*d* (which constitutes, with the touch panel 1*a*, a press position detection unit, a button operation detection unit, a button operation appropriateness determination unit, and button operation facilitating unit), and functions as a man-machine interface which links the copier 100 with a user.

As is well known, in the touch panel 1*a*, a transparent film pressure sensor such as using a resistance membrane is provided on the entire display face of a display panel, and when a user presses, using fingers or the like, operation buttons displayed on the display panel by the operation display control unit 1*d*, the film pressure sensor outputs operation signals indicating press positions (press coordinates) to the operation display control unit 1*d*. On the touch panel a, the operation buttons to which various functions are respectively allocated by the operation display control unit 1*d* are displayed in a predetermined layout. It should be noted that, because the film pressure sensor is provided on the entire display face of the display panel, the press position can be detected even when a region in which an operation button is not displayed is pressed.

Figure 2A:
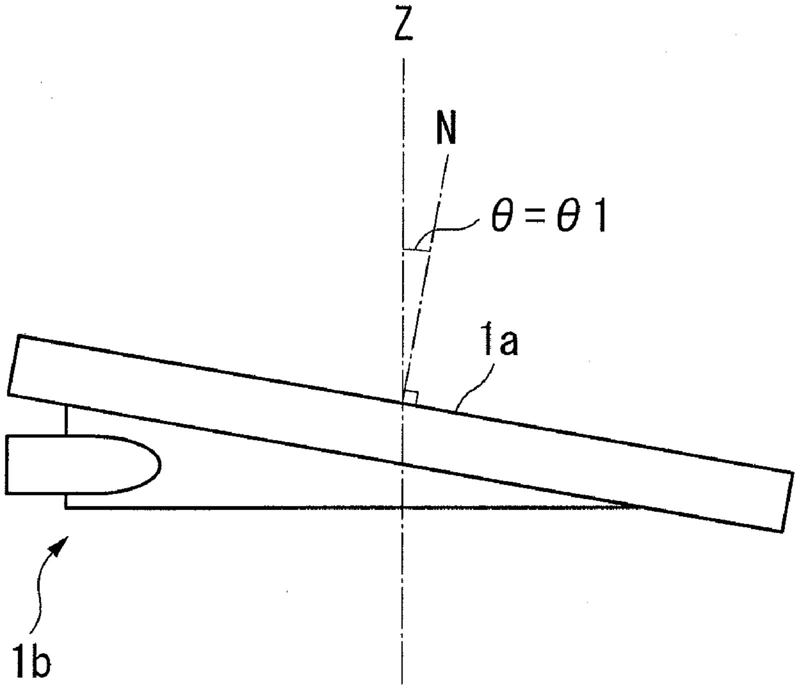
FIGS. 2A and 2B are schematic diagrams showing inclination angle set states of a touch panel 1*a* set by a variable angle support mechanism 1*b* in the first embodiment of the present invention, in particular.
Figure 2B:
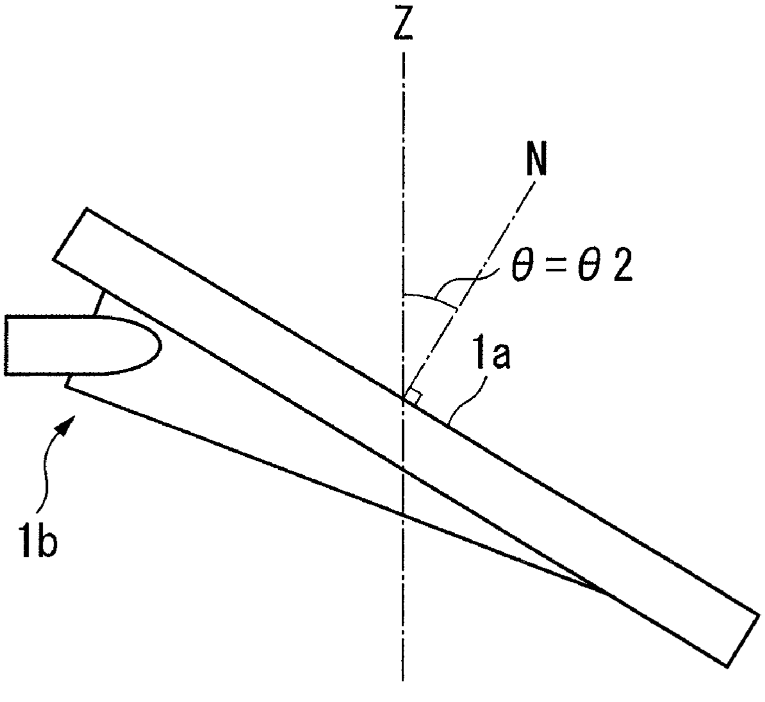

The variable angle support mechanism 1*b* is a mechanism which supports the touch panel while allowing the inclination angle thereof to be freely changed. FIGS. 2A and 2B are schematic diagrams showing inclination angle set states of a touch panel 1*a* set by a variable angle support mechanism 1*b*. The variable angle support mechanism 1*b* variably sets the inclination angle of the touch panel 1*a* in a "default" state shown in FIG. 2A and in a "down" state shown in FIG. 2B by rotatably supporting axes provided on both side faces of the touch panel 1*a*. The "default" state is an inclination angle set state in which the operation face (display face) of the touch panel 1*a* is set at an angle suitable for a user of average height, and the "down" state is an inclination angle set state in which the operation face (display face) of the touch panel 1*a* is set at an angle suitable for a user of a height smaller than the average height. Specifically, the inclination angle of the touch panel 1*a* is defined as an angle .theta. defined by a normal N of the touch panel 1*a* and a vertical line Z. When the angle .theta. in the "default" state is designated as .theta.1, and the angle .theta. in the "down" state is designated as .theta.2, an inequality .theta.1<.theta.2 is satisfied. In other words, the "down" state is a state in which the inclination angle is greater than that in the "default" state.

The operation key 1*c* is an operation key (a hardware key) such as a power button, or a copy start button, other than the operation buttons displayed on the touch panel 1*a*. The operation buttons displayed on the touch panel 1*a* are displayed, by the operation display control unit 1*d*, on the display panel by way of software based on a predetermined program. On the other hand, the operation key 1*c* is physically provided as a hardware key, and outputs operation signals based on the operation by a user to the operation display control unit 1*d*.

The operation display control unit 1*d* is a control device which controls the touch panel 1*a* and the operation key 1*c* under control by the main control unit 6, and includes an MPU (Micro Processing Unit), an internal memory, and interface circuits which exchange various signals with the touch panel 1*a*, the operation key 1*c*, and the main control unit 6. The operation display control unit 1*d* executes an operation display control for the touch panel 1*a*, and transmits operation commands of a user to the main control unit 6, based on an operation display control program stored in the internal memory, the operation signals input from the touch panel 1*a* and the operation key 1*c*, control commands input from the main control unit 6, and setting information of various regions (to be separately described) set on the touch panel 1*a*.

More specifically, the operation display control unit 1*d* sets types and layout of the operation buttons to be displayed on the touch panel 1*a* based on the control commands input from the main control unit 6, and also determines which operation button is pressed based on the operation signals input from the touch panel 1*a* and the operation signals input from the operation key 1*c*, which is output to the main control unit 6 as an operation command of the user.

As described above, the operation signals input to the operation display control unit 1*d* from the touch panel 1*a* is signals indicating the press coordinates in the touch panel 1*a* made by a user. The operation display control unit 1*d* sets in advance recognition regions K (coordinate regions) corresponding to the positions of various operation buttons displayed on the touch panel la for the various operation buttons, respectively, and determines which operation button is operated by comparing the recognition regions K with the coordinates indicated by the operation signals input from the touch panel 1*a*. In addition to the recognition regions K, the operation display control unit 1*d* further sets upper regions H disposed upper-next to the recognition regions K, and lower regions L disposed lower-next to the recognition regions K.

Figure 3:
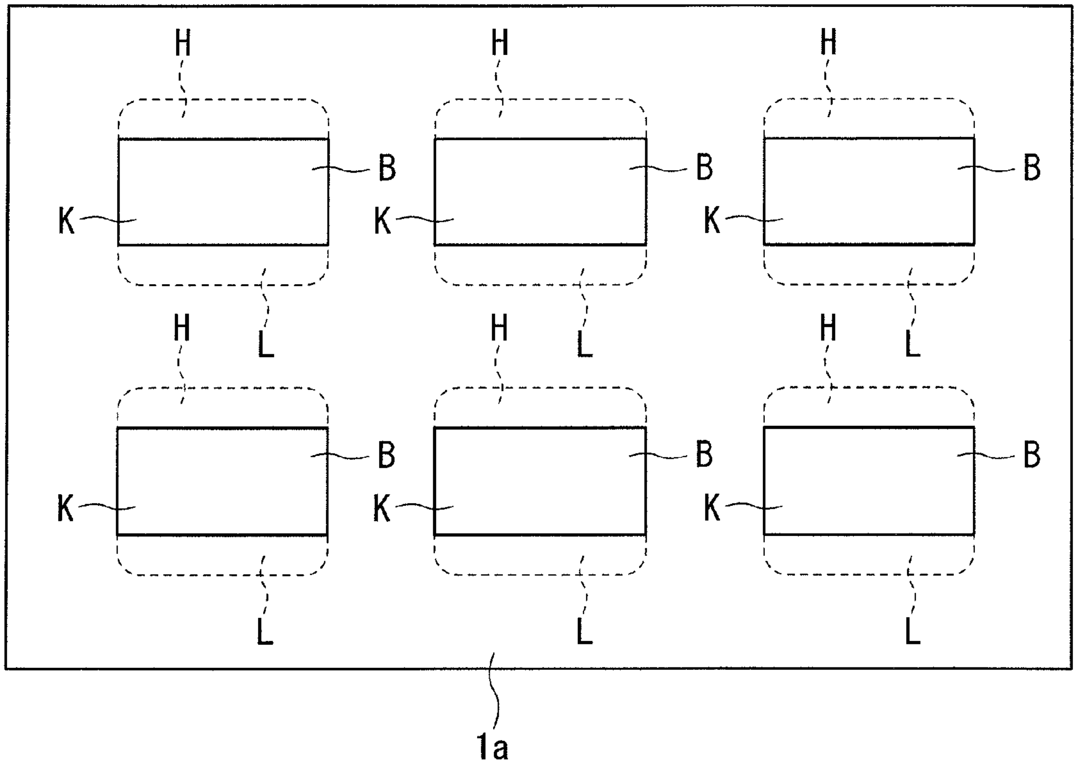
FIG. 3 is a schematic diagram showing recognition regions K, upper regions H, and lower regions L in the first embodiment of the present invention.

FIG. 3 is a schematic diagram showing the recognition regions K, the upper regions H, and the lower regions L. With regard to each of operation buttons B displayed on the touch panel 1*a*, the recognition region K, the upper region H, and the lower region L are set depending on the size of the display region of the button B, and such setting information of the recognition region K, the upper region H, and the lower region L is stored in advance in the internal memory of the operation display control unit 1*d*. In the present embodiment, the upper regions H are located farther than the recognition regions K from a user operating the touch panel 1*a*, and the lower regions L are located closer than the recognition regions K to the user. It should be noted that when a user presses only the upper region H or lower region L, an operation of the operation button B adjacent to thereto is not recognized; however, the press operation itself is detected.

In addition, the display control unit 1*d* corresponds to the angle determination unit (the button operation appropriateness determination unit) and angle change urging unit (the button operation facilitating unit) of the present invention. Although the details will be separately described below, the display control unit 1*d* determines whether the inclination angle of the touch panel 1*a* is appropriate based on operation signals input from the touch panel 1*a*, and displays a message urging the user to change the inclination angle change of the touch panel 1*a* when it is determined that the inclination angle of the touch panel 1*a* is inappropriate.

The image reading unit 2 reads an image (manuscript image) of original copies auto-fed by an ADF (Auto Document Feeder) based on the control command input from the main control unit 6 or of an original copy put on a platen glass using a line sensor, executes a conversion into image data (manuscript image data), and outputs the image data to the image storing unit 3. The image storing unit 3 is a semiconductor memory, a hard disc drive, and the like, stores the manuscript image data based on the control command input from the main control unit 6, and reads out and outputs the manuscript image data to the image processing unit 4.

The image processing unit 4 applies various image processings as necessary to the manuscript image data based on the control command input from main control unit 6, executes a conversion into image data in the form of printing adapted to the printing unit 5, and then outputs the image data to the printing unit 5. The image processings include, for example, an image processing relating to enlarging or reducing printing. When the image reading unit 2 reads color original copies, the manuscript image data are RGB data (color image data) corresponding to the three primary colors of light, and the image processing unit 4 converts such RGB data into the image data in the form of printing adapted to the printing unit 5, such as YMCK data, i.e., image data constituted by fundamental colors of Y (yellow), M (magenta), C (cyan), and K (black), and then outputs the image data to the printing unit 5.

The printing unit 5 prints the manuscript image based on the image date in the form of printing which are input from the image processing unit 4 onto paper fed from a paper cassette based on the control command input from the main control unit 6. The printing unit 5 is, for example, a tandem type printer in which four developing devices corresponding to toner of the above fundamental colors are arranged on a secondary transfer belt, and carries out color printing onto paper based on the YMCK image data input from the image processing unit 4.

The main control unit 6 includes an MPU (Micro Processing Unit), an internal memory, and interface circuits which exchange various signals with the operation display unit 1, the image reading unit 2, the image storing unit 3, the image processing unit 4, and the printing unit 5, and controls the entire operations of the copier 100 based on the control program stored in advance in the internal memory and operation commands input from the operation display unit 1. The main control unit 6 exchanges various signals with the operation display control unit 1*d* of the operation display unit 1 using a predetermined communication protocol, thereby the main control unit 6 grasps the operation state of the operation display unit 1 to control the same.

Figure 4:
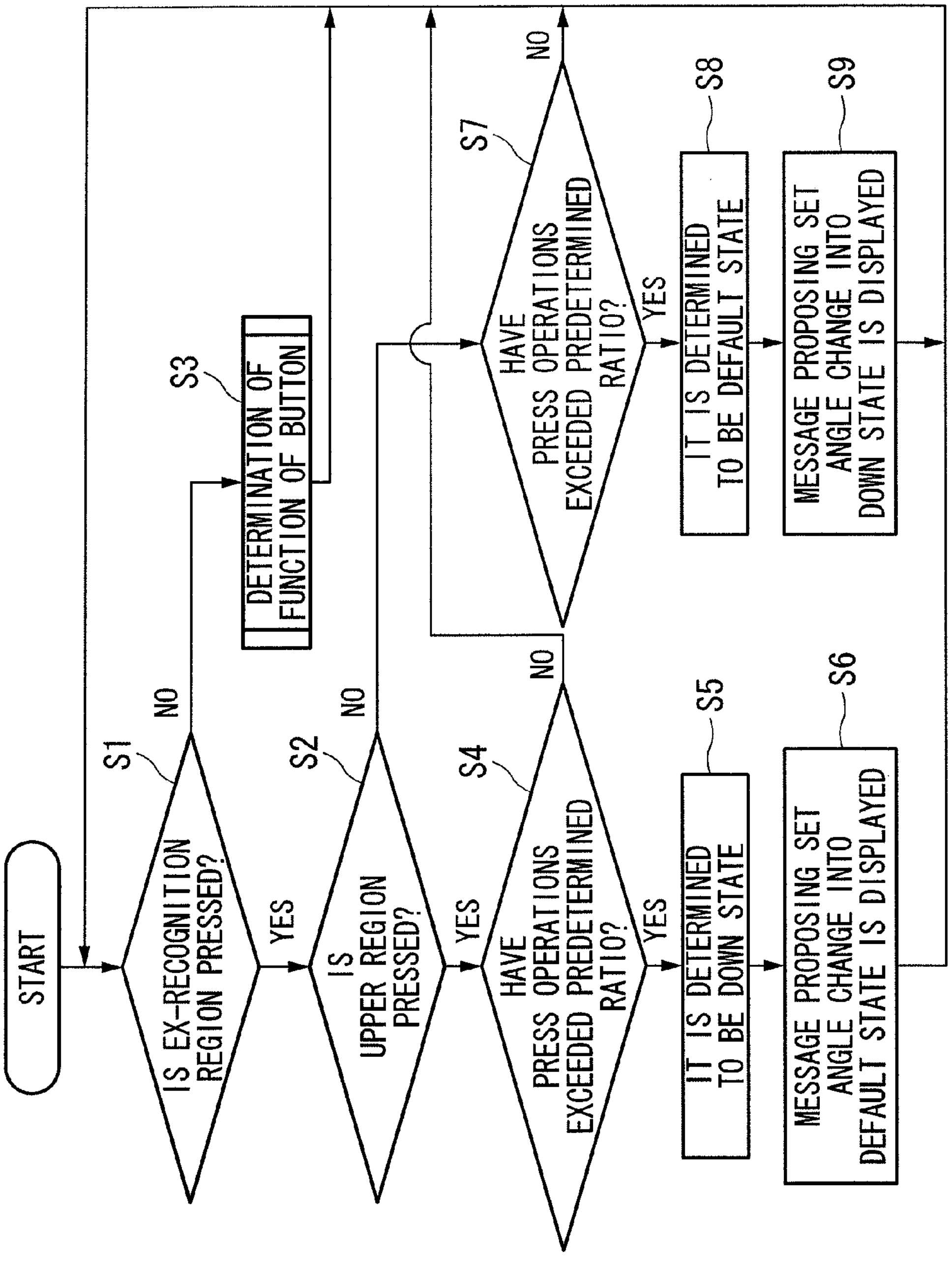
FIG. 4 is a flowchart showing the operation of the primary portion of the copier 100 in the first embodiment of the present invention.

Next, the operation of the primary portion of the copier 100 will be explained in details with reference to the flowchart shown in FIG. 4. The flowchart only indicates a portion (primary portion) particularly relating to the present invention among various processes to be executed by the operation display control unit 1*d* (more specifically, the MPU of the display control unit 1*d*) based on an operation display control program.

When the touch panel 1*a* is pressed by a user, the operation display control unit 1*d* first determines whether the press coordinates fall within a region out of the recognition region K (this region may be simply referred to as an ex-recognition region) (step S1). When the determination is "Yes", the operation display control unit 1*d* determines whether the press coordinates fall within the upper region H (step S2), and when the determination in step S1 is "No", a button function determination process in step S3 is executed, i.e., it is determined which recognition region K of the operation button is pressed, and then the entire processes are terminated.

When the determination in step S2 is "Yes", i.e., the press coordinates fall within the upper region H, the operation display control unit 1*d* determines whether the ratio of the number of presses applied to the upper regions H over a predetermined period with respect to the total number of presses applied to the touch panel 1*a* over the predetermined period exceeds a predetermined ratio stored in advance in the internal memory (step S4), and when the determination is "Yes", the operation display control unit 1*d* determines that the touch panel 1*a* is inappropriately set in the "down" state (step S5), and displays, on the touch panel 1*a*, a message urging the user to change the inclination angle so as to place the touch panel 1*a* in the "default" state (step S6).

On the other hand, when the determination in step S2 is "No", i.e., the press coordinates fall within the lower region L, the operation display control unit 1*d* determines whether the ratio of the number of presses applied to the lower regions L over a predetermined period with respect to the total number of presses applied to the touch panel 1*a* over the predetermined period exceeds a predetermined ratio stored in advance in the internal memory (step S7), and when the determination is "Yes", the operation display control unit 1*d* determines that the touch panel 1*a* is inappropriately set in the "default" state (step S8), and displays, on the touch panel 1*a*, a message urging the user to change the inclination angle of the touch panel 1*a* to that in the "down" state (step S9).

When the determinations in steps S4 and S7 are "No", i.e., the ratio of the number of presses applied to the upper regions H or the lower regions L over the predetermined period with respect to the total number of presses applied to the touch panel 1*a* over the predetermined period does not exceed the predetermined ratio, the process in step S1 is executed, and the next press operation is waited.

According to such a first embodiment, because the operation display control unit 1*d* automatically determines appropriateness of the inclination angle of the touch panel 1*a* depending on the press position (press coordinates) applied by a user, and displays, on the touch panel 1*a*, a message urging the user to change the inclination angle, the user can easily change the inclination angle of the touch panel 1*a* to that in an appropriate state based on the message. Therefore, it is possible for a user to always operate the touch panel 1*a* of which inclination angle is optimized, and thus misoperations can be prevented, and the operability can be improved.

It should be note that the present invention is not limited to the first embodiment, and the following variants, for example, can be conceived.

(1) The operation display control unit 1*d* in the first embodiment adopts, as a method for determining appropriateness of the inclination angle of the touch panel 1*a*, a method in which it is determined whether the ratio of the number of presses applied to the upper region H or the lower region L over a predetermined period with respect to the total number of presses applied to the touch panel 1*a* over the predetermined period exceeds a predetermined ratio; however, the method for determining appropriateness of the inclination angle of the touch panel 1*a* is not limited to this. For example, the number of presses applied to all of the operation buttons may be counted, and it may be determined whether the inclination angle of the touch panel 1*a* is appropriate depending on whether the number of continuous presses applied to the upper regions H or the lower regions L of the operation buttons exceeds a predetermined threshold.

More specifically, the number of continuous presses applied to the upper region H or the lower region L is not evaluated while paying attention on only one operation button, but the number of presses applied to all of the operation buttons is counted, and it is determined that the inclination angle of the touch panel 1*a* is inappropriate when the number of continuous presses applied to the upper region H or the lower region L of the operation buttons exceeds a predetermined threshold.

(2) Moreover, instead of the above method for determining appropriateness of the inclination angle of the touch panel 1*a*, it may be determined whether the inclination angle of the touch panel 1*a* is appropriate depending on whether the number of continuous presses applied to the upper region H or the lower region L of one of the operation buttons exceeds a predetermined threshold.

(3) In the first embodiment, a message urging the user to change the inclination angle of the touch panel 1*a* is displayed on the touch panel 1*a*; however, a method for urging the user to change the inclination angle of the touch panel 1*a* is not limited to this. For example, voice announcement may be used for urging the user to change the inclination angle.

(4) In the first embodiment, the description was provided on a case in which the present invention is applied to the copier 100; however, the present invention can be applied to various image formation devices other than the copier 100 or to various apparatuses in which a touch panel is used as an operation display device.

(5) Furthermore, in the first embodiment, the touch panel 1*a* and the operation key 1*c* are controlled by the operation display control unit 1*d*; however, the operation display control unit 1*d* may be omitted by providing the control function of the operation display control unit 1*d* in the main control unit 6.

(6) The "down" state in which the inclination angle is set greater than that in the "default" state is not limited to just one stage, but several "down" states may be set, or even "down" states may be set in a stepless manner.

A second embodiment of the present invention will be explained below with reference to the drawings.

Figure 5:
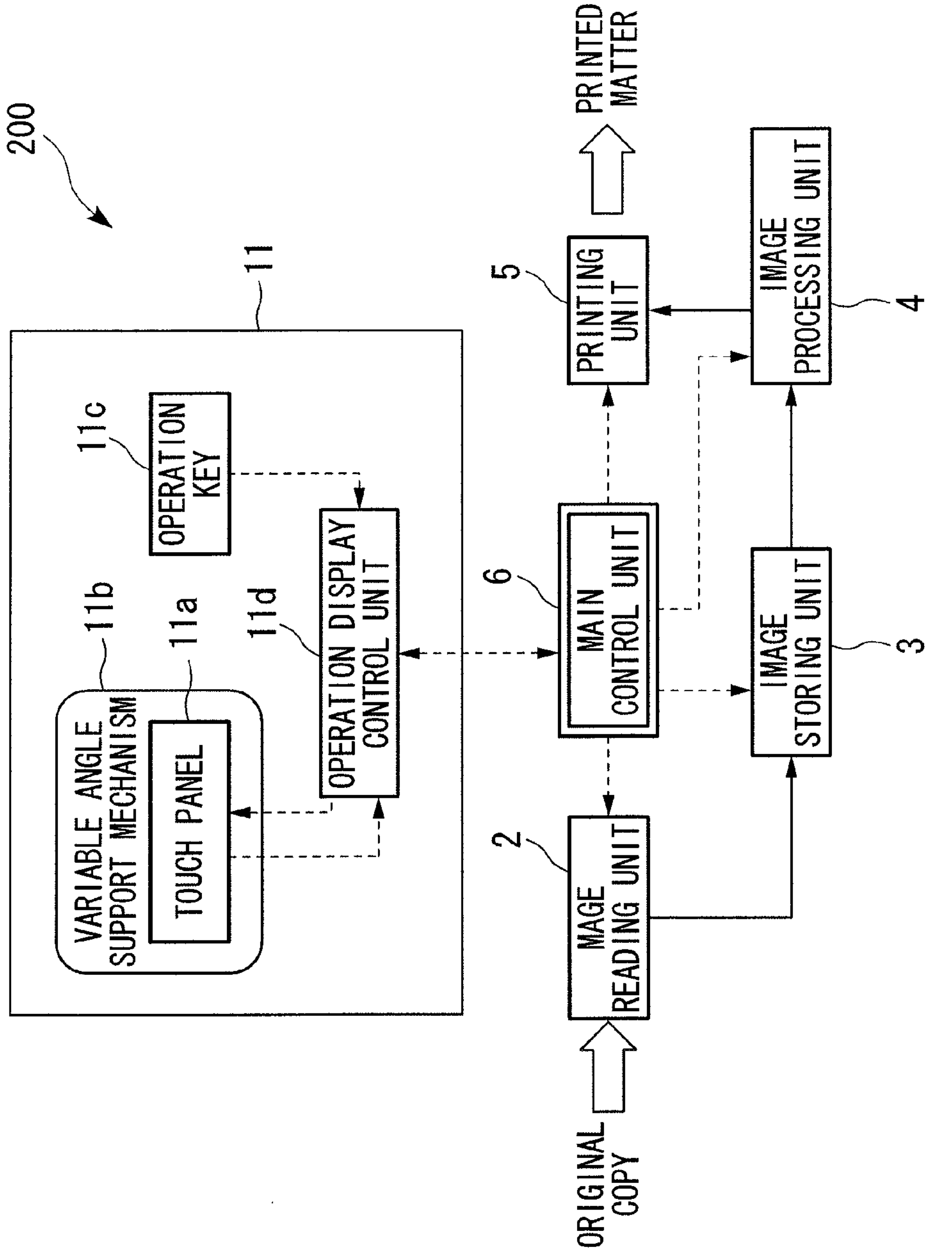
FIG. 5 is a block diagram showing a functional constitution of a copier 200 according to a second embodiment of the present invention.

FIG. 5 is a block diagram showing a functional constitution of a copier 200 (an image formation device) according to the second embodiment of the present invention.

As shown in FIG. 5, the copier 200 includes an operation display unit 11 (an operation device), the image reading unit 2, the image storing unit 3, the image processing unit 4, the printing unit 5, and the main control unit 6. Because the image reading unit 2, the image storing unit 3, the image processing unit 4, the printing unit 5, and the main control unit 6 are identical to that in the first embodiment, a detailed explanation thereof is omitted.

As shown in the figure, the operation display unit 11 includes a touch panel 11*a*, the variable angle support mechanism 1*b*, an operation key 1*c*, and an operation display control unit 11*d* (which constitutes, with the touch panel 11*a*, a press position detection unit, a button operation detection unit, a button operation appropriateness determination unit, and button operation facilitating unit), and functions as a man-machine interface which links the copier 200 with a user.

Figure 7:
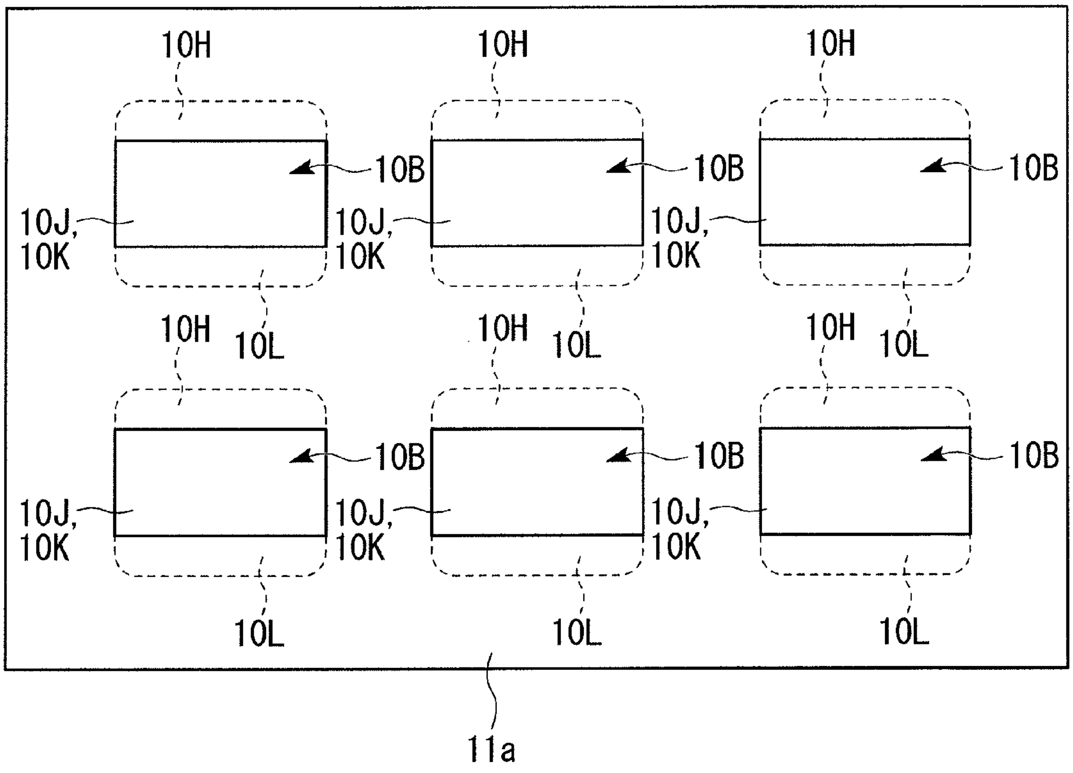
FIG. 7 is a schematic diagram showing recognition regions, upper regions, and lower regions in the second embodiment of the present invention.

As is well known, in the touch panel 11*a*, a transparent film pressure sensor such as using a resistance membrane is provided on the display face of a display panel, and operation buttons 10B to which various functions are respectively allocated by the operation display control unit 11*d* are displayed in a predetermined layout (see FIG. 7). When a user presses the operation buttons 10B using fingers or the like, the film pressure sensor outputs operation signals indicating press positions (press coordinates) to the operation display control unit 11*d*.

Figure 6A:
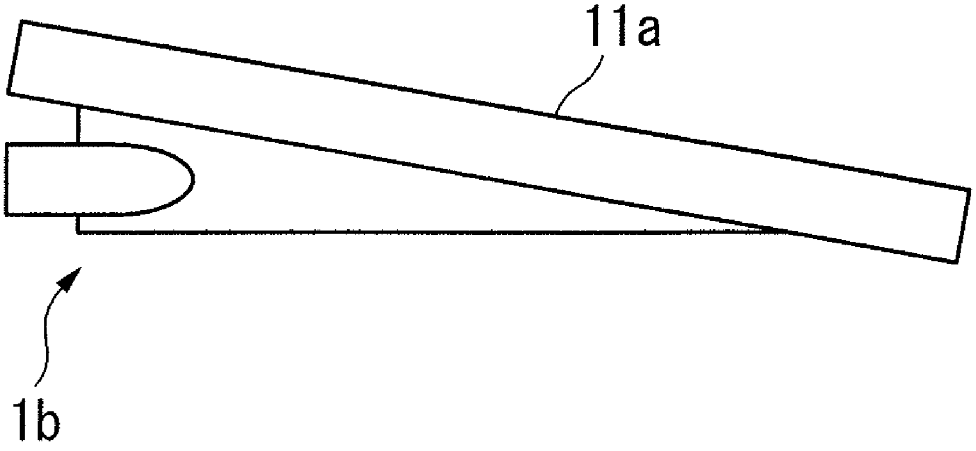
FIGS. 6A and 6B are schematic diagrams showing inclination angle set states of a touch panel set by the variable angle support mechanism in the second embodiment of the present invention, in particular.
Figure 6B:
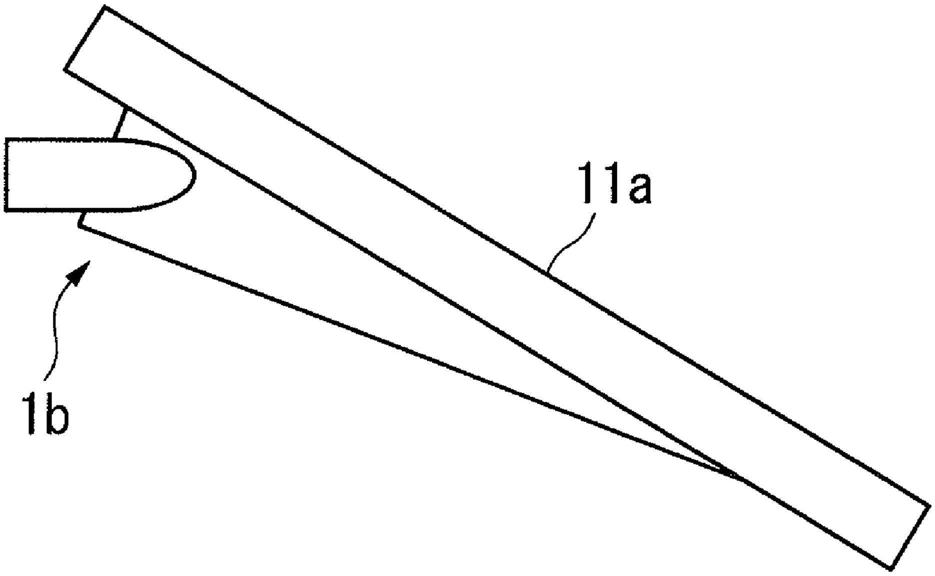

FIGS. 6A and 6B are schematic diagrams showing inclination angle set states of a touch panel 11*a* set by the variable angle support mechanism 1*b*.

The variable angle support mechanism 1*b* is a mechanism supporting the touch panel 11*a* while allowing the inclination angle thereof to be freely changed. The variable angle support mechanism 1*b* variably sets the inclination angle of the touch panel 11*a* in a "default" state shown in FIG. 6A and in a "down" state shown in FIG. 6B by rotatably supporting axes provided on both side faces of the touch panel 11*a*.

The "default" state is an inclination angle set state in which the operation face (display face) of the touch panel 11*a* is set at an angle suitable for a user of average height, and the "down" state is an inclination angle set state in which the operation face of the touch panel 11*a* is set at an angle suitable for a user of a height smaller than the average height or a user sitting in a wheelchair.

The operation display control unit 11*d* is a control device which controls the touch panel 11*a* and the operation key 11*c* under control by the main control unit 6, and includes an MPU (Micro Processing Unit), an internal memory, and interface circuits which exchange various signals with the touch panel 11*a*, the operation key 1*c*, and the main control unit 6.

The operation display control unit 11*d* executes an operation display control for the touch panel 11*a*, and transmits operation commands of a user to the main control unit 6, based on an operation display control program stored in the internal memory, the operation signals input from the touch panel 1*a* and the operation key 1*c*, control commands input from the main control unit 6, and setting information of various regions (to be separately described) set on the touch panel 1*a*.

More specifically, the operation display control unit 11*d* sets types and layout of the operation buttons 10B to be displayed on the touch panel 11*a* based on the control commands input from the main control unit 6, and also determines which operation button 10B is pressed based on the operation signals input from the touch panel 11*a* and the operation signals input from the operation key 1*c*, which is output to the main control unit 6 as an operation command of the user.

As described above for the touch panel 11*a*, the operation signals input to the operation display control unit 11*d* from the touch panel 11*a* is signals indicating the press coordinates in the touch panel 11*a* made by a user.

FIG. 7 is a schematic diagram showing display regions 10J, recognition regions 10K, upper regions 10H, and lower regions 10L of the touch panel 11*a*.

The operation display control unit 11*d* sets in advance the recognition regions 10K (coordinate regions) corresponding to the positions of the display regions 10J of various operation buttons 10B displayed on the touch panel 11*a* for the various operation buttons 10B, respectively, and determines which operation button 10B is operated by comparing the recognition regions K with the coordinates indicated by the operation signals input from the touch panel 11*a*.

In addition to the recognition regions 10K, the operation display control unit 11*d* further sets the upper regions 10H disposed upper-next to the recognition regions 10K, and the lower regions 10L disposed lower-next to the recognition regions 10K. The upper regions 10H and lower regions 10L are set depending on the sizes of the various operation buttons 10B. In the present embodiment, the upper regions 10H are located farther than the recognition regions 10K from a user operating the touch panel 11*a*, and the lower regions 10L are located closer than the recognition regions 10K to the user. It should be noted that when a user presses only the upper region H or lower region L, an operation of the operation button 10B adjacent to thereto is not recognized; however, the press operation itself is detected.

The setting information of the display regions 10J, the recognition regions 10K, the upper regions 10H, and the lower regions 10L is stored in advance in the internal memory of the operation display control unit 1*d*.

In addition, the display control unit 11*d* corresponds to the misoperation determination unit (the button operation appropriateness determination unit) and button enlarging unit (the button operation facilitating unit) of the present invention. Although the details will be separately described below, the display control unit 11*d* enlarges the operation buttons 10B when it is determined that a user tends to misoperate the operation buttons 10B or a user tends to mis-recognize the positions in the touch panel 11*a* to be pressed based on operation signals input from the touch panel 1*a*.

Here, the phrase "enlarging the operation buttons 10B" means that both of the display regions 10J and the recognition regions 10K of the operation buttons 10B in the touch panel 11*a* are enlarged.

Next, the operation of the primary portion of the copier 200 will be explained in details.

Figure 8:
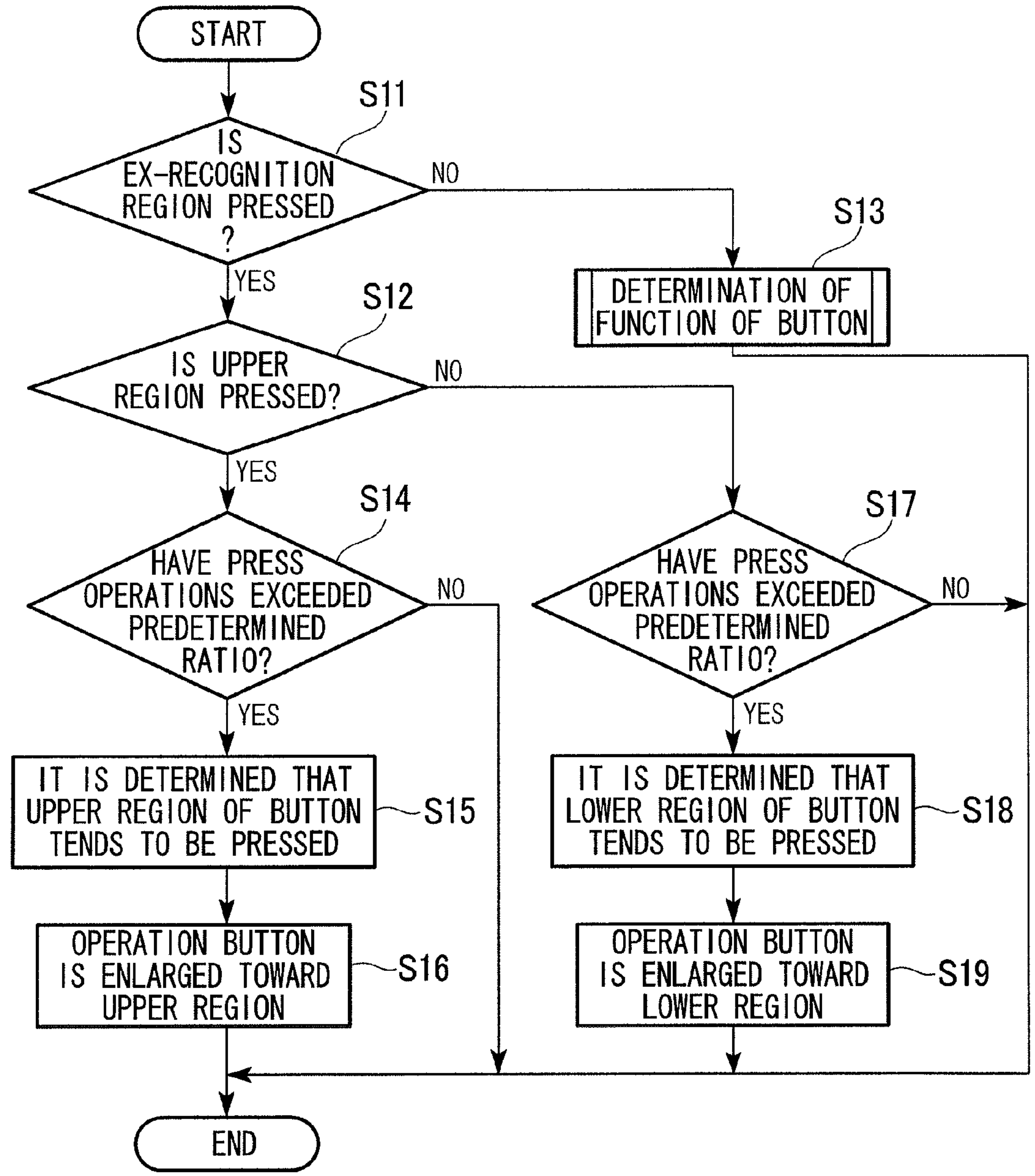
FIG. 8 is a flowchart showing the flow of the various processes (only a primary portion is extracted) executed by an operation display control unit in the second embodiment of the present invention.
Figure 9A:
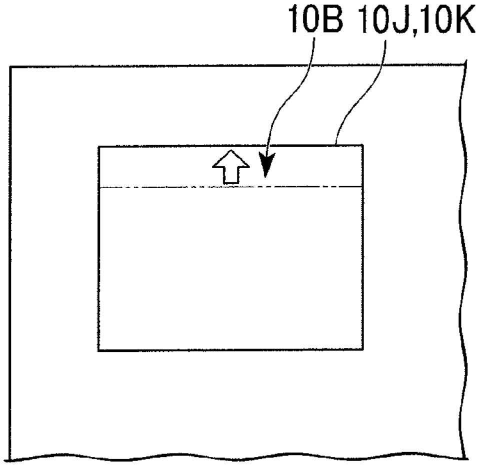
FIGS. 9A and 9B are plan views of a touch panel showing examples of enlarged operation buttons in the second embodiment.
Figure 9B:
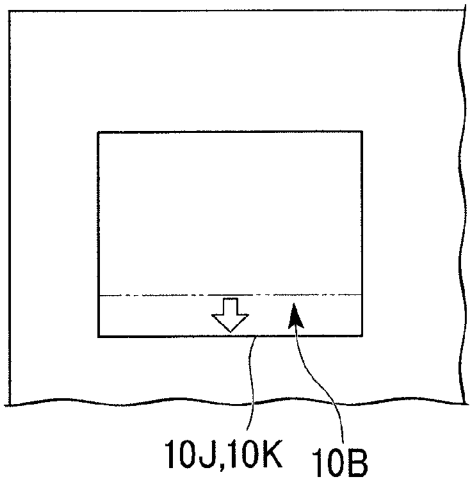

FIG. 8 is a flowchart only indicating a portion (primary portion) particularly relating to the present invention among various processes to be executed by the operation display control unit 11*d* (more specifically, the MPU of the display control unit 11*d*) based on an operation display control program. FIGS. 9A and 9B are plan views of the touch panel 11*a* showing examples of enlarged operation buttons 10B.

When the touch panel 11*a* is pressed by a user, the operation display control unit 11*d* first determines whether the press coordinates fall within a region out of the recognition region 10K (this regions may be simply referred to as an ex-recognition region) (step S1). When the determination is "Yes", the operation display control unit 11*d* determines whether the press coordinates fall within the upper region 10H (step S12), and when the determination in step S11 is "No", a button function determination process in step S13 is executed, i.e., it is determined which recognition region 10K of the operation buttons 10B is pressed, and then the entire processes are terminated.

When the determination in step S12 is "Yes", i.e., the press coordinates fall within the upper region 10H, the operation display control unit 11*d* determines whether the ratio of the number of presses applied to the upper regions 10H over a predetermined period with respect to the total number of presses applied to the touch panel 11*a* over the predetermined period exceeds a predetermined ratio stored in advance in the internal memory (step S14), and when the determination is "Yes", the operation display control unit 11*d* determines that the user tends to mis-recognize the positions of the operation buttons 10B to the upper side (step S15), and enlarges the operation buttons 10B such that the longitudinal dimensions of the operation buttons 10B are expanded toward the upper side (step S16). In FIG. 9A, the operation button 10B after enlarging is indicated by a solid line, and the direction of expansion is indicated by an arrow.

On the other hand, when the determination in step S12 is "No", i.e., the press coordinates fall within the lower region 10L, the operation display control unit 11*d* determines whether the ratio of the number of presses applied to the lower regions 10L over a predetermined period with respect to the total number of presses applied to the touch panel 11*a* over the predetermined period exceeds a predetermined ratio stored in advance in the internal memory (step S17), and when the determination is "Yes", the operation display control unit 11*d* determines that the user tends to mis-recognize the positions of the operation buttons 10B to the lower side (step S18), and enlarges the operation buttons 10B such that the longitudinal dimensions of the operation buttons 10B are expanded toward the lower side as shown in FIG. 9B (step S19).

When the determinations in steps S14 and S17 are "No", i.e., the ratio of the number of presses applied to the upper regions 10H or the lower regions 10L over the predetermined period with respect to the total number of presses applied to the touch panel 11*a* over the predetermined period does not exceed the predetermined ratio, the entire processes are terminated, and the next press operation is waited.

According to such a second embodiment, the operation display control unit 11*d* automatically determines appropriateness of the press positions in the touch panel 11*a* by a user based on the press positions (press coordinates) in the touch panel 11*a* by the user, and enlarges the longitudinal dimensions of the operation buttons 10B when the press positions are inappropriate.

Therefore, according to the second embodiment, when a user tends to mis-recognize the positions to be pressed while operating the touch panel 11*a*, the operation buttons 10B displayed on the touch panel 11*a* are enlarged and re-displayed; therefore, it is possible to increase confidence that an operation to a button that is allocated to a desired operation is accepted when the user presses the operation button 10B.

In other words, even if the inclination angle of the touch panel 11*a* is not optimal for a user, misoperations due to such inappropriateness can be significantly reduced; therefore, it is possible to increase confidence that an operation intended by the user is accepted, thereby comfortable operation conditions and improvement in operability can be achieved.

Figure 10A:
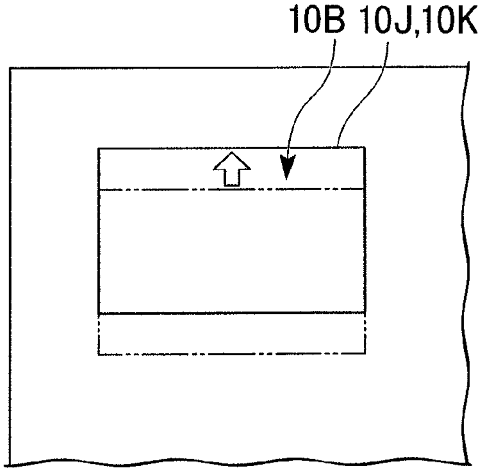
FIGS. 10A and 10B are plan views of a touch panel showing examples of shifted operation buttons in a variant of the second embodiment.
Figure 10B:
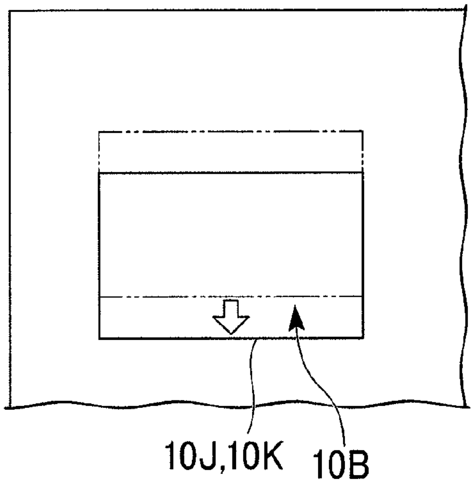

It should be noted that, in the second embodiment, when a user tends to mis-recognize the positions (or tends to misoperate the operation buttons 10B), the operation buttons 10B are enlarged toward the upper side or lower side; however, practical implementation is not limited to this, and, for example, the operation buttons 10B may be shifted toward the upper side or lower side, as shown in FIGS. 10A and 10B (in FIGS. 10A and 10B, the operation button 10B after shifting is indicated by a solid line, the operation button 10B before shifting is indicated by a two-dot chain line, and the direction of shift is indicated by an arrow).

Furthermore, in the above embodiment, when a user tends to mis-recognize the positions (or tends to misoperate the operation buttons 10B), the operation buttons 10B are enlarged toward the upper side or lower side; however, practical implementation is not limited to this, and, for example, the operation buttons 10B may be enlarged toward both of the upper side and lower side.

Figure 11A:
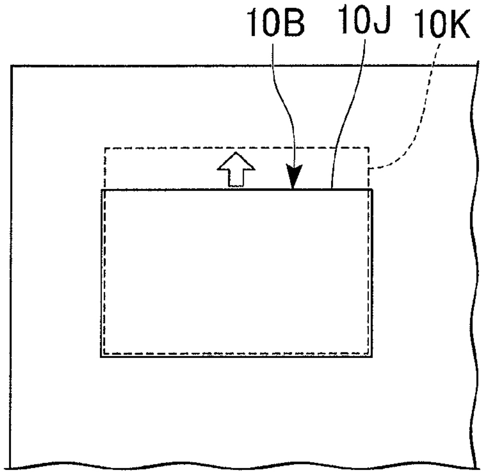
FIGS. 11A and 11B are plan views of a touch panel showing examples, as a variant of the second embodiment, in which only the recognition regions of the operation buttons are enlarged.
Figure 11B:
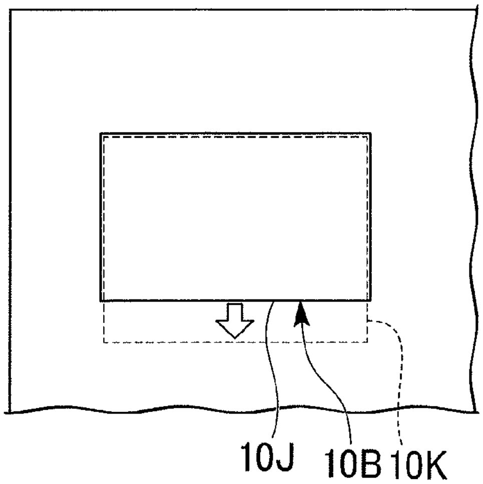

Moreover, in the above embodiment and an a variant thereof, the phrase "enlarging the operation buttons 10B" means that both of the display regions 10J and the recognition regions 10K of the operation buttons 10B in the touch panel 11*a* are enlarged; however, practical implementation is not limited to this, and, for example, only the recognition region 10K may be enlarged without changing the display region 10J of the operation button 10B in the touch panel 11*a*, as shown in FIGS. 11A and 11B. It should be noted that a portion of the border of the recognition region 10K that overlaps the border of the display region 10J is shown slightly shifted therefrom for the purpose of easy recognition in FIGS. 11A and 11B; however, this is just for convenience, and, in practice, the width of the display region 10J coincides with that of the recognition region 10K, the bottom sides are identical in FIG. 11A, and top sides are identical in FIG. 11B.

Furthermore, in the variant shown in FIGS. 10A and 10B, both of the display regions 10J and the recognition regions 10K of the operation buttons 10B are shifted; however, practical implementation is not limited to this, and, for example, only the recognition region 10K may be shifted without changing the display region 10J of the operation button 10B in the touch panel 11*a*. If only the recognition region 10K is enlarged (or shifted) without changing the display region 10J as in such variants, the appearance of the operation button 10B does change; therefore, it is possible to increase confidence that an operation intended by the user is accepted without imparting unusual sensations to the user.

Moreover, in the above embodiment, whether a user tends to mis-recognize the positions (or tends to misoperate the operation buttons 10B) is determined depending on whether the ratio of the number of presses applied to the upper regions 10H over a predetermined period with respect to the total number of presses applied to the touch panel 11*a* over the predetermined period exceeds a predetermined ratio stored in advance in the internal memory; however, practical implementation is not limited to this.

For example, the number of presses applied to all of the operation buttons 10B may be counted, and a determination may be made depending on whether the number of continuous presses applied to the upper regions 10H or the lower regions 10L of the operation buttons 10B exceeds a predetermined threshold. Furthermore, for example, a determination may be made depending on whether the number of continuous presses applied to the upper region 10H or the lower region 10L of a particular operation button 10B exceeds a predetermined threshold.

Moreover, in the above embodiment, an example in which the operation display unit includes a touch panel whose inclination angle is freely adjustable; however, practical implementation is not limited to this, and the present invention may be applied to an operation device including a fixed type touch panel.

In this case, for a user who cannot easily see or operate the display of the touch panel because the position (or inclination angle) of the touch panel is fixed, misoperations can be prevented, and operability can be improved.

Furthermore, in the above embodiment, the touch panel 11*a* and the operation key 1*c* are controlled by the operation display control unit 11*d*; however, the operation display control unit 11*d* may be omitted by providing the control function of the operation display control unit 11*d* in the main control unit 6.

In addition, in the above embodiment, the description was provided on a case in which the present invention is applied to a copier; however, the present invention can be applied to various image formation devices other than the copier or to various apparatuses in which a touch panel is used as an operation display device.

A third embodiment of the present invention will be explained below with reference to the drawings.

Figure 12:
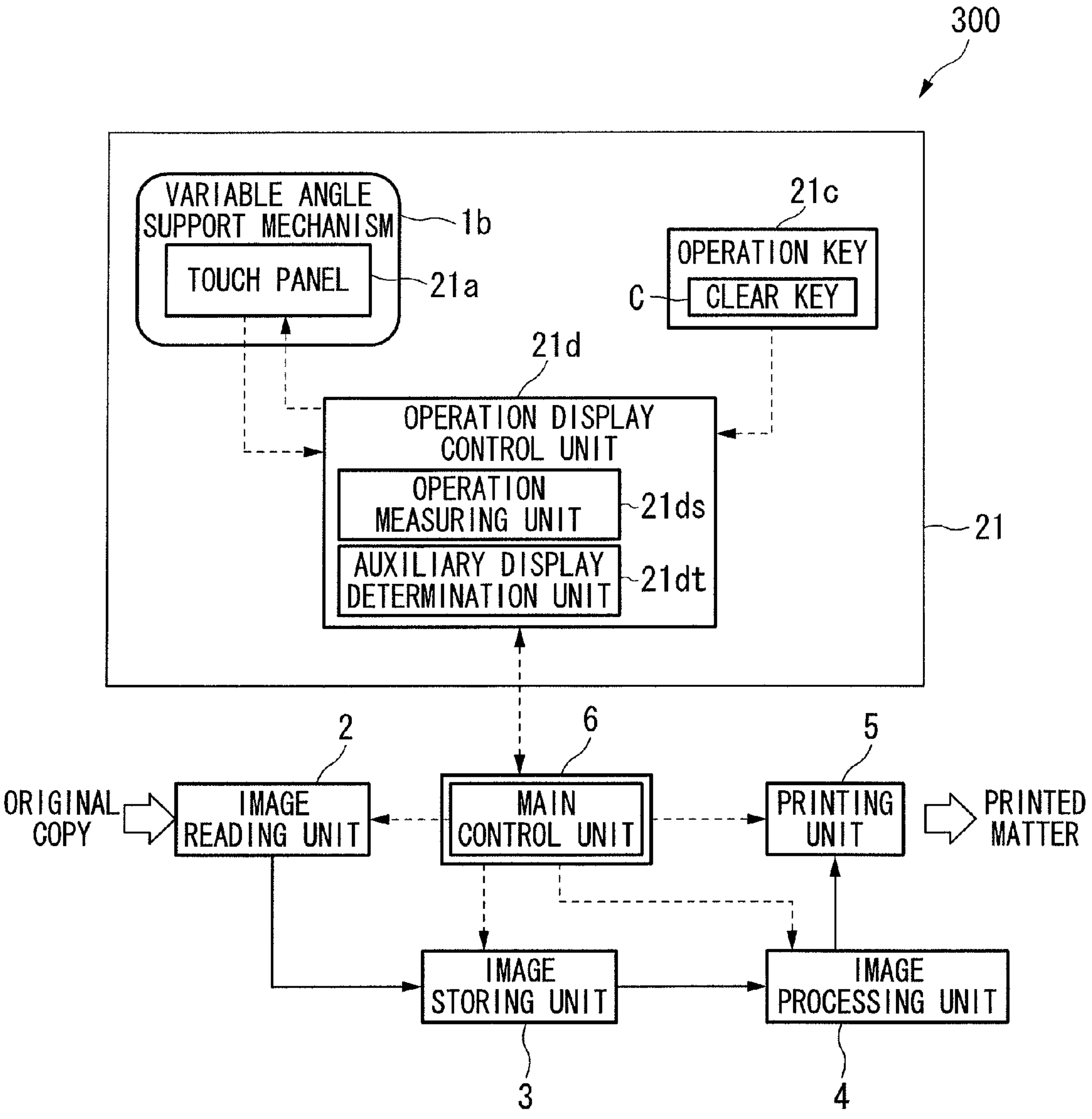
FIG. 12 is a block diagram showing a functional constitution of a copier 300 according to a third embodiment of the present invention.

FIG. 12 is a block diagram showing a functional constitution of a copier 300 according to the third embodiment of the present invention.

As shown in FIG. 12, the copier 300 includes an operation display unit 21, the image reading unit 2, the image storing unit 3, the image processing unit 4, the printing unit 5, and the main control unit 6. Because the image reading unit 2, the image storing unit 3, the image processing unit 4, the printing unit 5, and the main control unit 6 are identical to that in the first embodiment, a detailed explanation thereof is omitted.

As shown in the figure, the operation display unit 21 includes a touch panel 21*a*, the variable angle support mechanism 1*b*, an operation key 21*c*, and an operation display control unit 21*d* (which constitutes, with the touch panel 21*a*, a press position detection unit, a button operation detection unit, a button operation appropriateness determination unit, and button operation facilitating unit), and functions as a man-machine interface which links the copier 300 with a user.

As is well known, in the touch panel 21*a*, a transparent film pressure sensor such as using a resistance membrane is provided on the display face of a display panel, and when a user presses, by touching using fingers or the like, operation buttons 20B displayed on the display panel by the operation display control unit 1*d*, the film pressure sensor outputs operation signals indicating press positions (touch positions) to the operation display control unit 21*d*. On the touch panel 21*a*, the operation buttons 20B to which various functions are respectively allocated by the operation display control unit 21*d* are displayed in a predetermined layout (see FIGS. 14A and 14B).

Figure 13A:
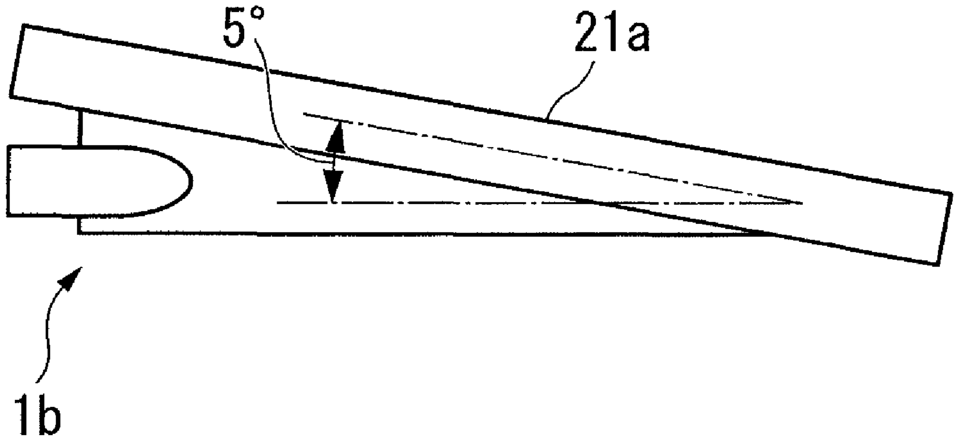
FIGS. 13A and 13B are schematic diagrams showing inclination angle set states of a touch panel 21*a* set by the variable support mechanism 1*b* in the third embodiment of the present invention, in particular.
Figure 13B:
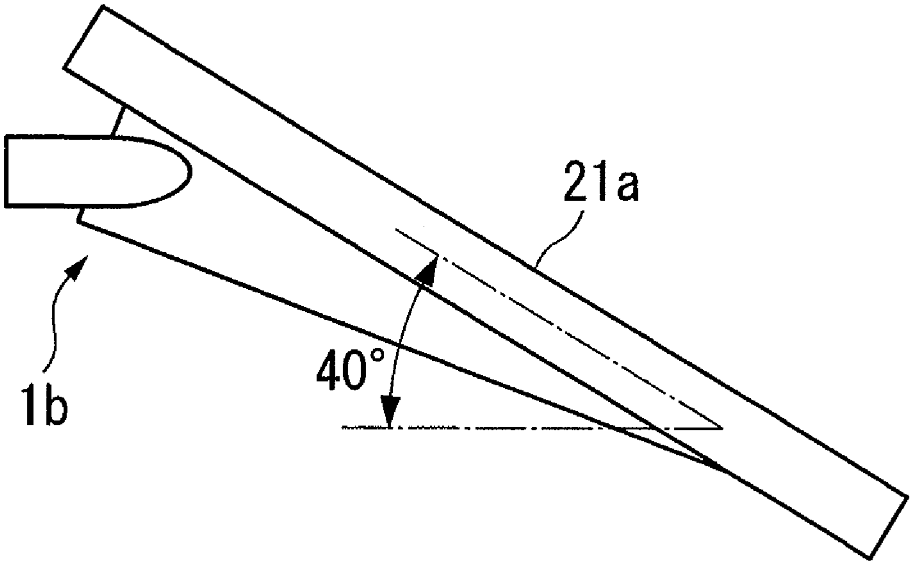

FIGS. 13A and 13B are schematic diagrams showing inclination angle set states of a touch panel 11*a* set by the variable angle support mechanism 1*b*.

The variable angle support mechanism 1*b* (an angle adjusting unit, a button operation facilitating unit) is a mechanism supporting the touch panel 21*a* while allowing the inclination angle thereof to be freely changed. The variable angle support mechanism 1*b* variably sets the inclination angle of the touch panel 21*a* in a "default" state shown in FIG. 13A and in a "down" state shown in FIG. 13B by rotatably supporting axes provided on both side faces of the touch panel 21*a*. The "default" state is an inclination angle set state in which the inclination angle of the touch panel 21*a* is set at a small angle (e.g., an inclination angle of approximately 5.degree.) so as to allow a user of average height to easily operate the operation face (display face) of the touch panel 21*a*, and the "down" state is an inclination angle set state in which the inclination angle of the touch panel 21*a* is set at a large angle (e.g., an inclination angle of approximately 40.degree.) so as to allow a user of a height smaller than the average height to easily operate the operation face.

As shown in FIG. 12, the operation key 21*c* is an operation key (a hardware key) such as a clear key C canceling operation functions, a power button, or a copy start button, other than the operation buttons 20B displayed on the touch panel 21*a*. The operation buttons 20B displayed on the touch panel 21*a* are displayed on the display panel by way of software based on a predetermined program stored in the operation display control unit 21*d*. On the other hand, the operation key 21*c* is physically provided as a hardware key, and outputs operation signals based on the operation by a user to the operation display control unit 21*d*.

The operation display control unit 21*d* is a control device which controls the touch panel 21*a* and the operation key 21*c* under control by the main control unit 6, and includes an MPU (Micro Processing Unit), an internal memory, and interface circuits which exchange various signals with the touch panel 21*a*, the operation key 21*c*, and the main control unit 6. The operation display control unit 21*d* transmits the operation display control signals of the touch panel 21*a* and operation commands of a user to the main control unit 6, based on an operation display control program stored in the internal memory, the operation signals input from the touch panel 21*a* and the operation key 21*c*, control commands input from the main control unit 6, and setting information of various regions (to be separately described) set on the touch panel 21*a*.

More specifically, the operation display control unit 1*d* sets types and layout of the operation buttons 20B to be displayed on the touch panel 21*a* based on the control commands input from the main control unit 6 (FIG. 14A), and also determines which operation button 20B or operation key is pressed based on the operation signals input from the touch panel 21*a* and the operation signals input from the operation key 21*c*, which is output to the main control unit 6 as an operation command of the user.

Figure 14A:
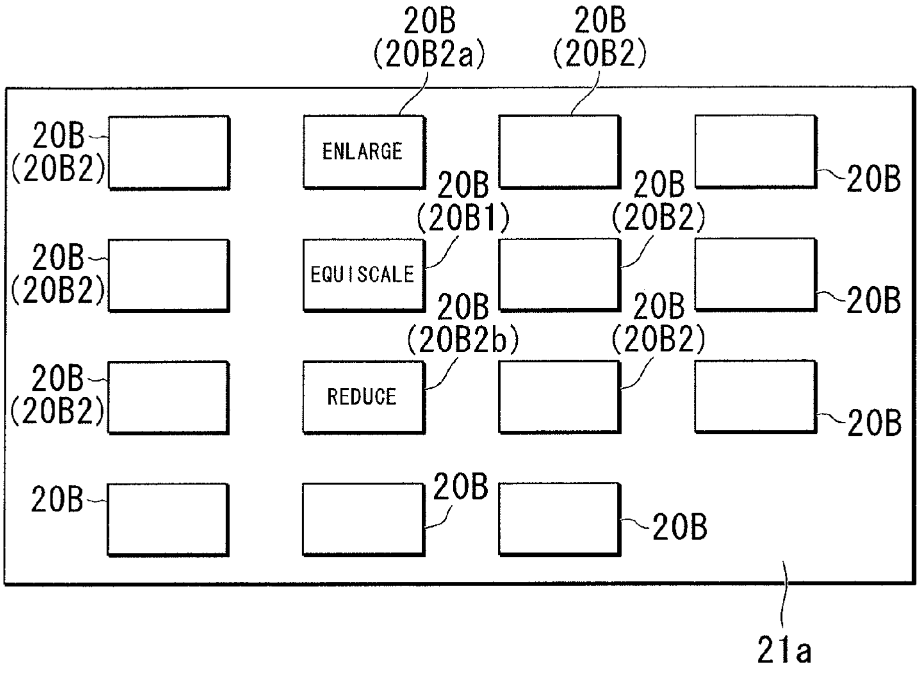
FIGS. 14A and 14B are schematic diagrams showing operation buttons 20B displayed on the touch panel 21*a*.
Figure 14B:
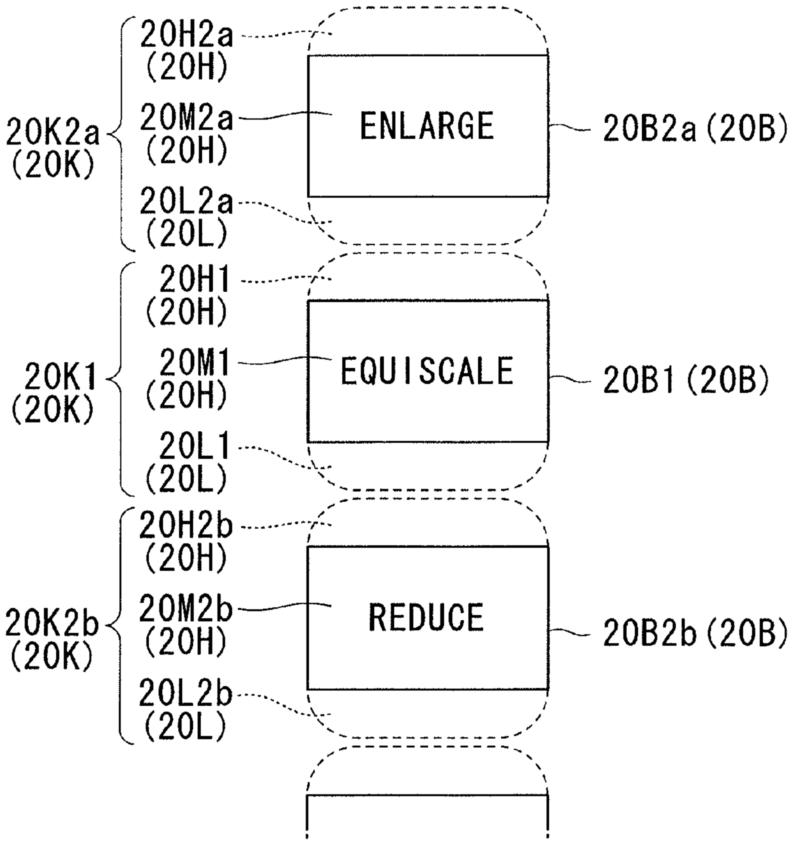

FIGS. 14A and 14B are schematic diagrams showing the operation buttons 20B displayed on the touch panel 21*a*.

FIG. 14A is an example of a layout of the operation buttons 20B displayed on the touch panel 21*a*. Because a plurality of operation buttons 20B must be displayed on a small display area, the operation buttons 20B are small, and only a small space is provided between adjacent operation buttons 20B. Therefore, misoperations between the adjacent operation buttons 20B are easy to occur, in particular, if the inclination angle of the touch panel 21*a* is inappropriate for a user, misoperations between the adjacent operation buttons 20B disposed in the longitudinal direction are easy to occur.

As described above, the operation signals input to the operation display control unit 21*d* from the touch panel 21*a* is signals indicating the press coordinates (touch coordinates) in the touch panel 21*a* made by a user. As shown in FIG. 14B, the operation display control unit 21*d* sets in advance button recognition regions 20K (202*a*, 20K1, 202*b*) (coordinate regions) corresponding to the positions of various operation buttons 20B displayed on the touch panel 21*a* for the various operation buttons 20B, respectively, and determines which operation button 20B is operated by comparing the button recognition regions 20K with the coordinates indicated by the operation signals input from the touch panel 21*a*.

The operation display control unit 21*d* sets the button recognition regions 20K which include the regions (middle regions 20M (20M2*a*, 20M1, 20M2*b*)) overlapping the display of the operation buttons 20B, as well as the regions upper-next to and lower-next to the middle regions 20M. In other words, in the button recognition regions 20K (20K2*a*, 20K1, 20K2*b*) excluding the middle regions 20M (20M2*a*, 20M1, 20M2*b*), the upper side regions are designated as upper regions 20H (20H2*a*, 20H1, 20H2*b*), and the lower side regions are designated as lower regions 20L (20L2*a*, 20L1, 20L2*b*). More specifically, when a touch is applied to the middle region 20M, the upper region 20H, or the lower region 20L, operation signals corresponding to the operation functions allocated to the operation button 20B are output to the main control unit 6. In the present embodiment, the upper regions 20H are located farther than the middle region 20M from a user operating the touch panel 1*a*, and the lower regions 20L are located closer than the middle region 20M to the user.

In addition, when a touch operation is applied to the button recognition region 20K, the operation display control unit 21*d* determines which of the middle region 20M, the upper region 20H, and the lower region 20L the press position is included in, and stores the result in the internal memory of the operation display control unit 21*d*.

It should be noted that the setting information of the button recognition regions 20K, the upper regions 20H, the middle regions 20M, and the lower regions 20L is stored in advance in the internal memory of the operation display control unit 21*d*.

Moreover, the operation display control unit 21*d* includes an operation measuring unit 21*ds* (a button operation detection unit), an auxiliary display determination unit 21*dt* (a button operation facilitating unit).

The operation measuring unit 21*ds* counts the number of repetitions of press operations applied to one of the operation buttons and canceling operations canceling the press operations.

For example, if a touch is applied to the button recognition region 20K1 of the operation button 20B1 (a first operation button) exhibiting an operation function of "equiscale", and the operation is canceled by the clear key C, the number of repetition is counted as one time. Then, if a further touch is applied to the button recognition region 20K1 of the operation button 20B1, and the operation is canceled by the clear key C, the number of repetitions is counted as two times.

Figure 15A:
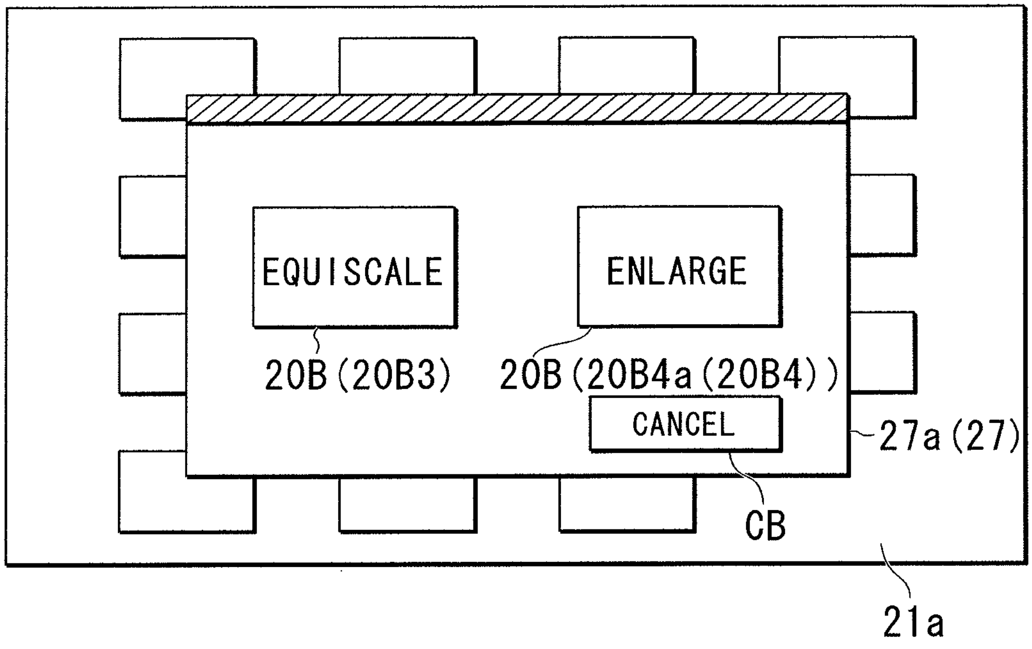
FIGS. 15A and 15B are schematic diagrams showing the touch panel 21*a* on which an auxiliary image 27 is displayed.
Figure 15B:
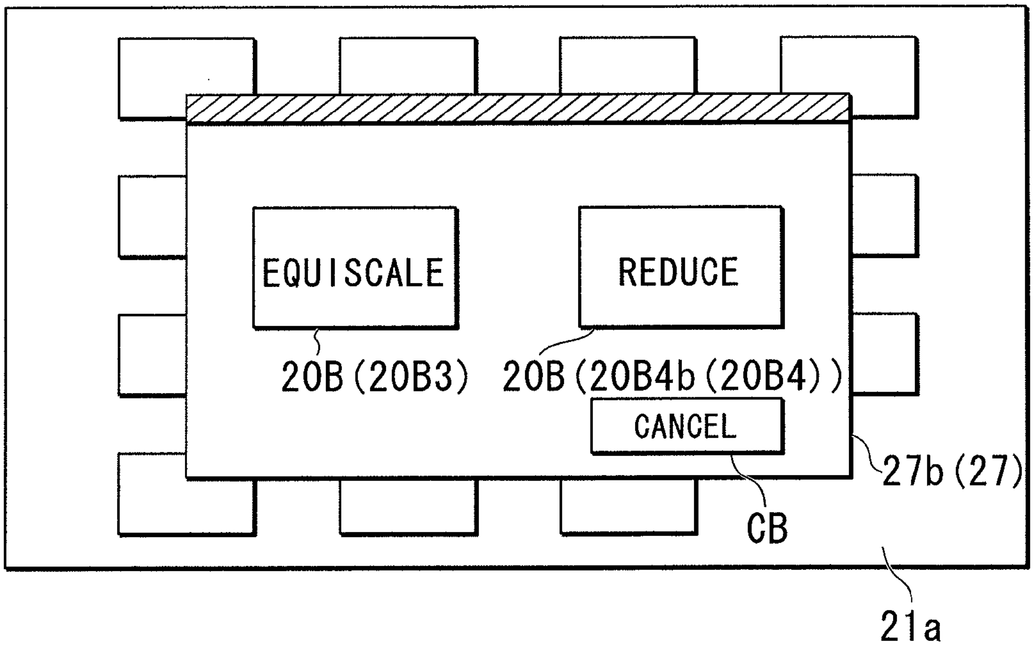

FIGS. 15A and 15B are schematic diagrams showing the touch panel 21*a* on which an auxiliary image 27 is displayed.

When the number of repetitions counted by the operation counting unit 21*ds* reaches a predetermined number of repetitions, the auxiliary display determination unit 21*dt* refers to information regarding the press positions stored in the internal memory of the operation display control unit 21*d*. If all of the repeated touch operations applied to the operation button 20B fall within the upper region 20H or the lower region 20L, the operation button 20B that indicates an operation function identical to that of an operation button 20B located upper-next to or lower-next to the operation button 20B is displayed in the auxiliary image 27.

More specific example will be explained with reference to FIGS. 15A and 15B. When the number of repetitions with regard to operation button 20B1 reaches a predetermined number of repetitions, in accordance with the following conditions, the auxiliary image 27 is displayed, which shows an operation button 20B3 (a third operation button) indicating an operation function of "equiscale" which is identical to that of the operation button 20B1, as well as an operation button 20B4 (a fourth operation button).

As shown in FIG. 15A, when all of the press positions for the operation button 20B1 fall within the upper region 20H1, the auxiliary display determination unit 21*dt* displays, in an auxiliary image 27*a*, an operation button 20B4*a* indicating an operation function of "enlarge" which is identical to that of the operation button 20B2*a* located upper-next to the operation button 20B1 among eight operation buttons 20B2 (second operation buttons) located next to the operation button 20B1.

Moreover, as shown in FIG. 15B, when all of the press positions for the operation button 20B1 fall within the lower region 20L, the auxiliary display determination unit 21*dt* displays, in an auxiliary image 27*b*, an operation button 20B4*b* ("reduce") which is an enlarged image of the operation button 20B2*b* located upper-next to the operation button 20B1.

The operation buttons 20B3 and 20B4 (20B3*a* and 20B4*b*) are larger than the operation buttons 20B1 and 20B2, and displayed in a laterally arranged manner. Moreover, a cancel button CB for deleting the auxiliary image 27 is displayed at a right-lower region of the auxiliary image 27.

It should be noted that if none of the above conditions are satisfied, i.e., the upper region 20H and the lower region 20L are touched at random, the auxiliary image 27 is not displayed.

Figure 16:
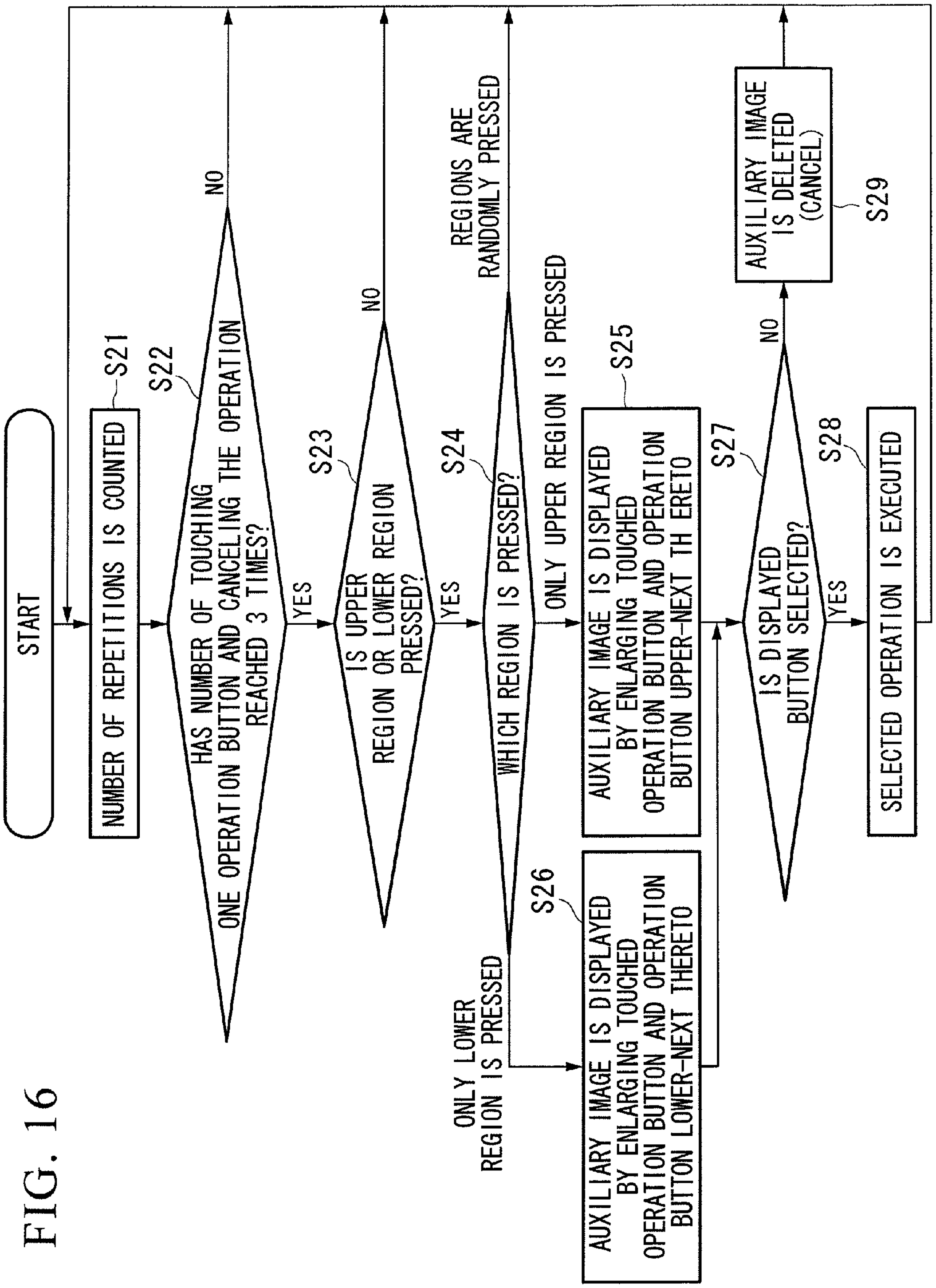
FIG. 16 is a flowchart showing the operation of the primary portion of the copier 300 in the third embodiment of the present invention.

Next, the operation of the primary portion of the copier 300 will be explained in details with reference to the flowchart shown in FIG. 16. The flowchart only indicates a portion (primary portion) particularly relating to the present invention among various processes to be executed by the operation display control unit 21*d* (more specifically, the MPU of the display control unit 21*d*) based on an operation display control program.

Below, a case in which touch operations to the operation button 20B1 ("equiscale") and operations canceling these touch operations are repeated will be explained. First, the operation counting unit 21 ds counts the number of repetitions (step S21) in which one touch operation to the operation button 20B1 and one operation canceling the touch operation, i.e., one press operation to the clear key C are deemed to be one counting unit.

Next, the auxiliary display determination unit 21*dt* determines (step S22) whether the counted number of repetitions coincides with a predetermined number of repetitions (three times in the third embodiment) stored in the internal memory in advance.

If the touch operation to the operation button 20B1 and the operation canceling the touch operation are repeated three times, the operation button which is aimed by the user may be the operation button 20B2*a* ("enlarge") located upper-next to the operated button 20B1 or the operation button 20B2*b* ("reduce") located lower-next to the operated button 20B1.

This is because the user may be using the touch panel 21*a* while the inclination angle thereof is inappropriate, and in this case, the user may touch the operation button 20B1 at a high probability although the operation button 20B aimed by the user is the operation button 20B2*a* ("enlarge") located upper-next to the operation button 20B1 or the operation button 20B2*b* ("reduce") located lower-next to the operated button 20B1. When the determination in step S22 is "No", the auxiliary display determination unit 21*dt* continues counting the number of repetitions after returning to step S21.

On the other hand, when the determination in step S22 is "Yes", i.e., when the operation button 20B1 is touched three times and the operation is cancelled three times, the auxiliary display determination unit 21*dt* determines whether the press position for the operation button 20B1 falls within the upper region 20H1 or within the lower region 20L1 (step S23).

When the determination in step S23 is "No", the operation display control unit 21*d* continues counting after returning to step S21. This is because, when the middle region 20M1 is touched, it can be deemed that the user is touching the operation button 20B1 according to his/her intention, and necessity of assisting the user is low.

When the determination in step S23 is "Yes", the display determination unit 21*dt* determines whether the press positions of three press operations for the touch recognition region 20K1 of the operation button 20B1 fall within the upper region 20H1 or within the lower region 20L1 (step S24).

If the press positions of three press operations only fall within the upper region 20H1, it is very likely that a user of small height is operating the touch panel 21*a* while the touch panel 21*a* is placed in the "default" state (i.e., being set at an inclination angle suitable for a user of average height), and the user aims the operation button 20B2*a*. Because, if operations under this condition are compared with operations under other conditions, the user tends to unconsciously touch the upper region 20H1 of the operation button 20B1, which is shifted downward from the operation button 20B2*a*. Accordingly, if the press positions of three press operations only fall within the upper region 20H1, the display determination unit 21*dt* displays the auxiliary image 27*a* on the touch panel 21*a*, in which the operation button 20B3 which is an enlarged image of the operation button 20B1 and the operation button 20B4*a* which is an enlarged image of the operation button 20B2*a* are laterally arranged, as shown in FIG. 15A (step S25).

On the other hand, if the press positions of three press operations only fall within the lower region 20L1, it is very likely that a user of average height is operating the touch panel 21*a* while the touch panel 21*a* is placed in the "down" state (i.e., being set at an inclination angle suitable for a user of small height), and the user aims the operation button 20B2*b*. Because, if operations under this condition are compared with operations under other conditions, the user tends to unconsciously touch the upper region 20L1 of the operation button 20B1, which is shifted upward from the operation button 20B2*b*.

Accordingly, if the press positions of three press operations only fall within the lower region 20L1, the display determination unit 21*dt* displays the auxiliary image 27*b* on the touch panel 21*a*, in which the operation button 20B3 which is an enlarged image of the operation button 20B1 and the operation button 20B4*b* which is an enlarged image of the operation button 20B2*b* are laterally arranged, as shown in FIG. 15B (step S26).

Moreover, if the upper region 20H and the lower region 20L are touched at random, the operation display control unit 21*d* does not display the auxiliary image 27, and continues counting the number of repetitions after returning to step S21. Because it is not possible to determine, based on the press positions, what type of user is operating, and which operation button 20B is aimed by the user.

After displaying the auxiliary image 27 in steps S25 or S26, the operation display control unit 21*d* determines whether the operation button 20B3 or 20B4 displayed in the auxiliary image 27 is selected by the user (step S27).

If the user touches the operation button 20B3 or 20B4 displayed in the auxiliary image 27, the operation function of the operation button 20B3 or 20B4 is executed (step S28), and then counting of the number of repetitions is continued.

On the other hand, if the cancel button CB is pressed, the auxiliary image 27 is deleted (step S29), and then counting of the number of repetitions is continued after returning to step S21.

It should be noted that the auxiliary display determination unit 21*dt* does not display the auxiliary image 27 if the touch operation to the operation button 20B which is not provided with another operation button 20B located upper-next thereto, such as an operation button 20B whose operation function is "enlarge" as shown in FIG. 14A, and the operation canceling the touch operation are repeated, even if three press operations fall within the upper region 20H because an operation button 20B which is estimated to have been aimed based on the press positions does not exist.

A similar situation occurs when three press operations fall within the lower region 20L of the operation button 20B which is not provided with another operation button 20B located lower-next thereto.

According to the third embodiment, the operation display control unit 21*d* detects that an operation assistance for a user is necessary based on the number of repetitions of the touch operations applied to the operation button 20B1 ("equiscale") and canceling operations canceling these operations. In addition, it is determined, based on the positions of the press operations applied to the operation button 20B1, that the operation button 20B aimed by the user is either the operation button 20B2*a* ("enlarge") located upper-next to the operation button 20B1 or the operation button 20B2*b* ("reduce") located lower-next to the operation button 20B1. Furthermore, the operation buttons 20B3 and 20B4 (20B4*a* or 20B4*b*) respectively having the operation functions same as that of the operation button 20B1 and either the operation button 20B2*a* or the operation button 20B2*b* are clearly displayed in the auxiliary image 27 in an alternative manner.

By this configuration, the user can easily re-select either the operation button 20B3 or the operation button 20B4. In this manner, misoperations can be prevented even if the inclination angle of the touch panel 21*a* is not suitable for the user's height.

Moreover, because misoperations may easily occur among the operation buttons 20B adjacent to each other in the vertical direction when the inclination angle of the touch panel 21*a* is inappropriate, the operation buttons 20B3 and 20B4 are displayed in the auxiliary image 27 in a laterally arranged manner. Furthermore, he operation buttons 20B3 and 20B4 are displayed so as to be larger than the operation buttons 20B1 and 20B2.

By this configuration, further misoperations can be prevented during the re-select operations on the auxiliary image 27.

Accordingly, even if the touch panel 21*a* is used in a state in which the inclination angle thereof is not optimized, and misoperations occur due to this, further misoperations can be prevented because the operation button 20B aimed by the user is rationally determined and displayed on the touch panel 21*a* so that the user can reliably select the aimed operation button.

FIGS. 17A, 17B, 17C, and 17D are diagrams showing set examples of the button recognition regions 20K and the like.

Figure 17A:
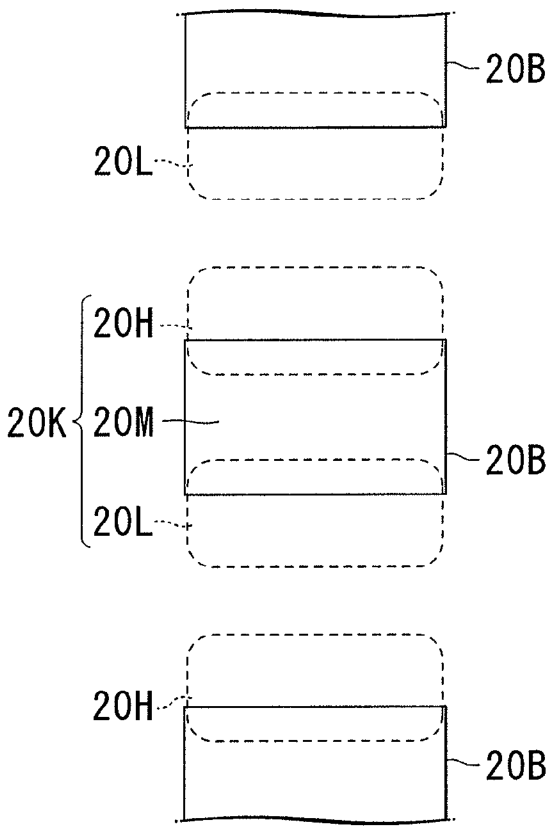
Figure 17B:
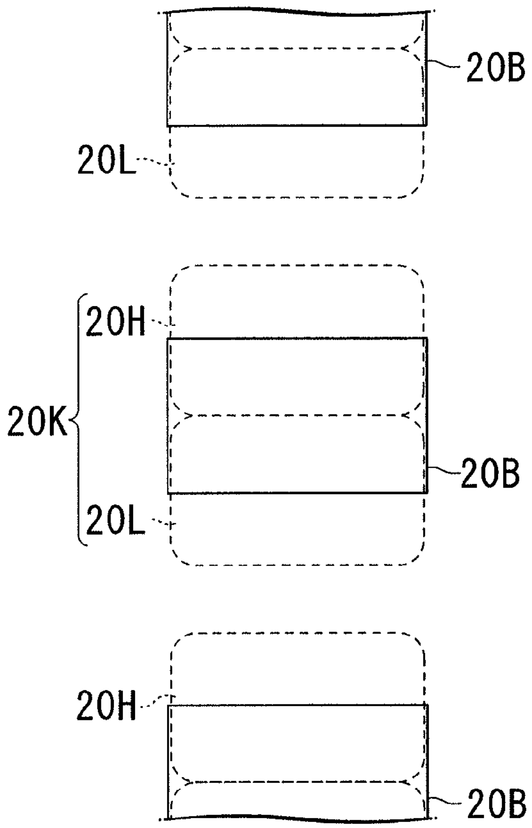

As shown in FIGS. 17A, 17B, 17C, and 17D, setting of the button recognition regions 20K and the like can be properly changed. As shown in FIGS. 17A and 17B, the middle regions 20M may be narrowed in the vertical direction, and the regions excluded by narrowing may be allocated to the upper regions 20H and the lower regions 20L. In this embodiment, when the press positions fall within the middle regions 20M, it is estimated that the user touches the operation buttons 20B according to his/her intention; however, the user might not touch the operation buttons 20B according to his/her intention if, for example, the arrangement of the operation buttons 20B is more complicated, or the size of the operation buttons 20B is smaller than that in the configuration shown in FIG. 14A. The above variants may be suitable for such a case.

Figure 17C:
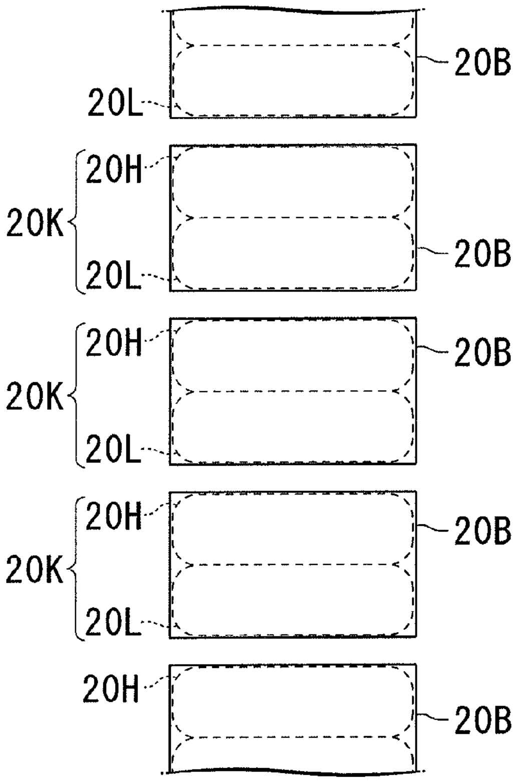
Figure 17D:
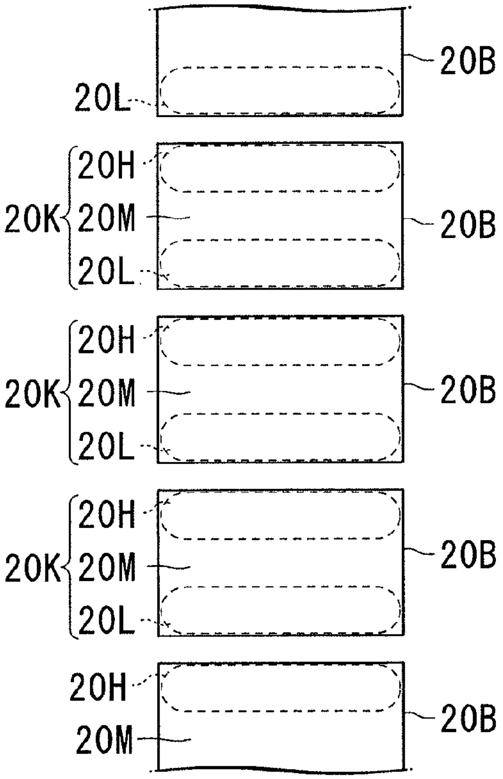

Moreover, as shown in FIG. 17C, the middle regions 20M may be omitted, and only the upper regions 20H and the lower regions 20L may be set. This is because the spaces between the operation buttons 20B adjacent to each other may be small. Similarly, as shown in FIG. 17D, the button recognition regions 20K do not necessarily have to include the regions upper-next to and lower-next to the middle regions 20M.

In addition, the variable angle support mechanism 1*b* does not necessarily have to be provided. In the case of a touch panel in which operation buttons are small, and the spaces between the operation buttons are also small, misoperations tend to easily occur even though the inclination angle is appropriate for the user. Misoperations in such a case may be prevented by the present invention without using the variable angle support mechanism 1*b*.

A fourth embodiment of the present invention will be explained below with reference to the drawings.

Figure 18:
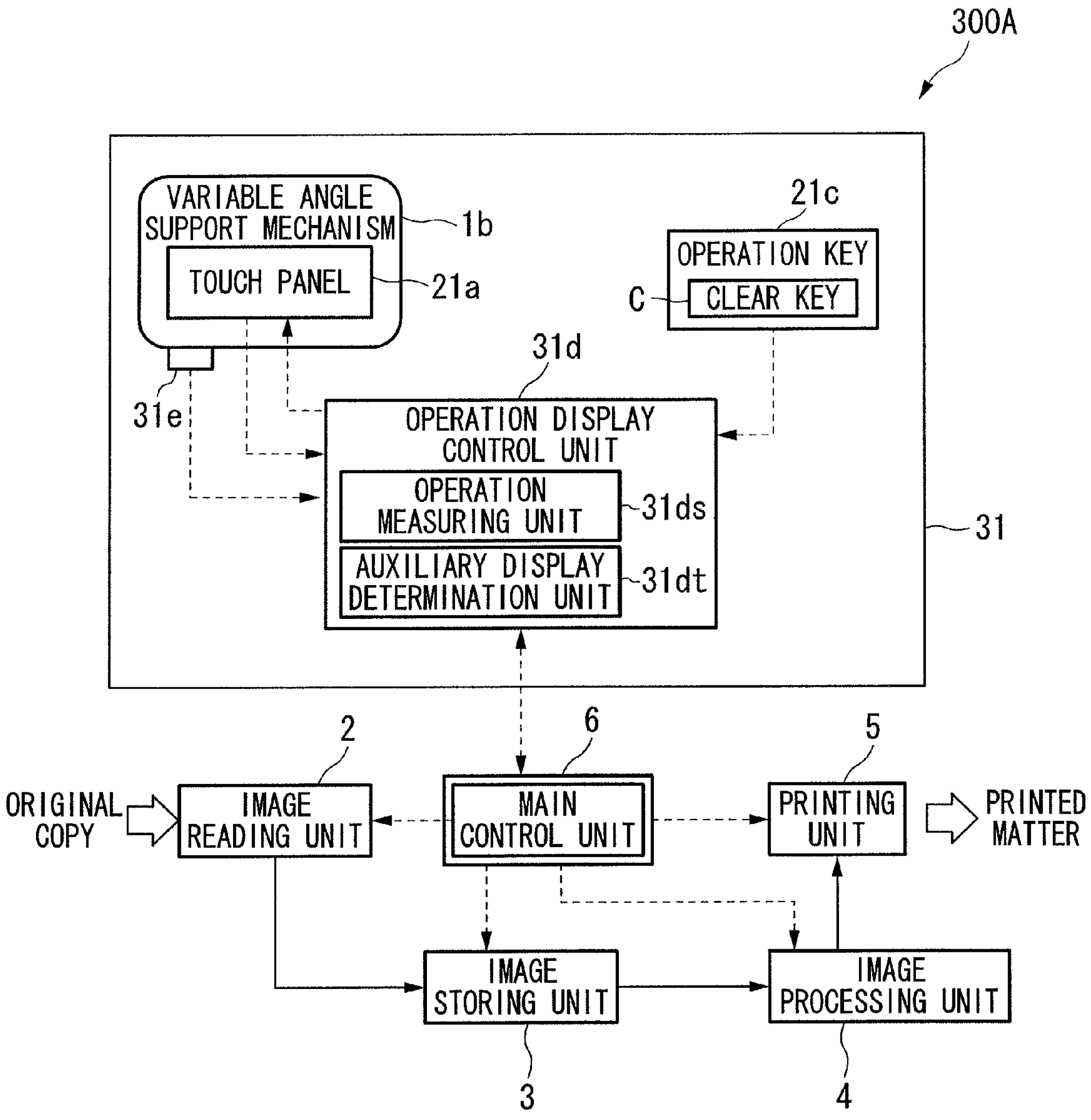
FIG. 18 is a block diagram showing a functional constitution of a copier 300A according to a fourth embodiment of the present invention.

FIG. 18 is a block diagram showing a functional constitution of a copier 300A according to the fourth embodiment of the present invention.

As shown in FIG. 18, the copier 300A includes an operation display unit 31, the image reading unit 2, the image storing unit 3, the image processing unit 4, the printing unit 5, and the main control unit 6.

It should be noted that explanation of the elements that are identical to that in the copier 300 is omitted.

The operation display unit 31 includes the touch panel 21*a*, the variable angle support mechanism 1*b* (an angle adjusting unit), an operation key 21*c*, and an operation display control unit 31*d* (which constitutes, with the touch panel 21*a*, a press position detection unit, a button operation detection unit, a button operation appropriateness determination unit, and button operation facilitating unit), and an angle measuring device 31*e* (an angle measuring unit). The angle measuring device 31*e* includes a contact switch. When the touch panel 21*a* is switched into the "default" state or the "down" state, the contact switch is switched by means of the axes provided on the variable angle support mechanism 1*b*, thereby the angle measuring device 31*e* sends setting state of the touch panel 21*a* ("default state" or "down state") to the operation display control unit 31*d*.

The operation display control unit 31*d* includes an operation measuring unit //3 Ids (a button operation detection unit), an auxiliary display determination unit 31*dt* (a button operation facilitating unit). The operation measuring unit 31*ds* is configured similar to the operation measuring unit 21*ds* of the copier 300.

When the number of repetitions counted by the operation counting unit 31*ds* reaches a predetermined number of repetitions, the auxiliary display determination unit 31*dt* displays, depending on the inclination angle of the touch panel 21*a*, the operation button 20B in the auxiliary image 27, which indicates an operation function identical to that of an operation button 20B located upper-next to or lower-next to the operation button 20B to which touch operations are repeatedly applied.

More specifically, when the inclination angle of the touch panel 21*a* is equal to or greater than a predetermined threshold, an operation button 20B3 which indicates an operation function identical to that of the operation button 20B1 as well as an operation button 20B4*a* which indicates an operation function identical to that of the operation button 20B2*a* located upper-next to the operation button 20B1 are displayed in the auxiliary image 27*a*, as shown in FIG. 15A.

Moreover, when the inclination angle of the touch panel 21*a* is smaller than the predetermined threshold, the operation button 20B3 which indicates an operation function identical to that of the operation button 20B1 as well as an operation button 20B4*b* which indicates an operation function identical to that of the operation button 20B2*b* located lower-next to the operation button 20B1 are displayed in the auxiliary image 27*b*, as shown in FIG. 15B.

The operation buttons 20B3 and 20B4 (20B3*a* and 20B4*b*) are larger than the operation buttons 20B1 and 20B2, and displayed in a laterally arranged manner. Moreover, a cancel button CB for deleting the auxiliary image 27 is displayed at a right-lower region of the auxiliary image 27.

It should be noted that, in the case of the copier 300A, the threshold value is set to, for example, an inclination angle of 20.degree. As described above, when the touch panel 21*a* is placed in the "default state", the inclination angle is 5.degree. which is smaller than the threshold value, and when the touch panel 21*a* is placed in the "down state", the inclination angle is 40.degree. which is greater than the threshold value.

Figure 19:
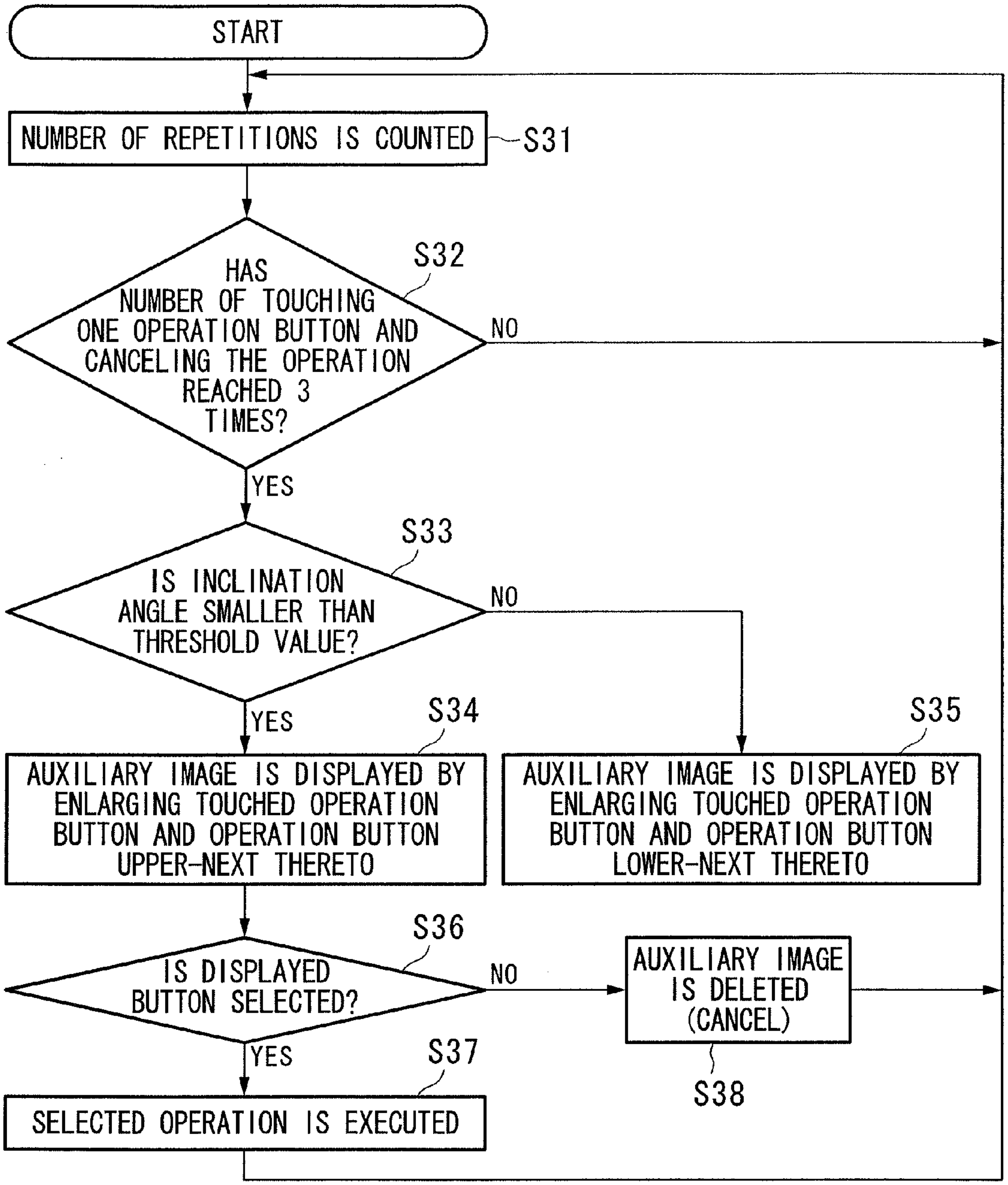
FIG. 19 is a flowchart showing the operation of the primary portion of the copier 300A in the fourth embodiment of the present invention.

Next, the operation of the primary portion of the copier 300A will be explained in details with reference to the flowchart shown in FIG. 19. Below, a case in which touch operations to the operation button 20B1 ("equiscale") shown in FIG. 14A and operations canceling these touch operations are repeated will be explained.

First, the operation counting unit 31*ds* counts the number of repetitions (step S31) in which one touch operation to the operation button 20B1 and one operation canceling the touch operation are deemed to be one counting unit.

Next, the auxiliary display determination unit 31*dt* determines (step S32) whether the counted number of repetitions coincides with a predetermined number of repetitions (three times in the fourth embodiment) stored in the internal memory in advance.

When the determination in step S32 is "No", the auxiliary display determination unit 31*dt* continues counting the number of repetitions after returning to step S31.

When the determination in step S32 is "Yes", the auxiliary display determination unit 31*dt* determines whether the inclination angle of the touch panel 21*a* is smaller than the threshold value (whether in the "default state") (step S33).

When the determination in step S33 is "Yes", i.e., when the inclination angle of the touch panel 21*a* is smaller than the threshold value ("default state"), the display determination unit 31*dt* displays the auxiliary image 27*a* on the touch panel 21*a*, in which the operation button 20B3 which indicates an operation function identical to that of the operation button 20B1 and the operation button 20B4*a* which indicates an operation function identical to that of an operation button 20B2*a* are laterally arranged, as shown in FIG. 15A (step S34).

This is because, when the inclination angle of the touch panel 21*a* is smaller than the threshold value ("default" state), the occurrence probability of misoperations is higher during the operations by a user of small height than during the operations by a user of average height, and, in this case, the user of small height tends to unconsciously touch the upper side of the recognition region 20K1 of the operation button 20B1, which is shifted downward from the operation button 20B2*a*, and thus it is very likely that the operation button 20B2*a* is the operation button aimed by the user.

On the other hand, when the determination in step S33 is "No", i.e., when the inclination angle of the touch panel 21*a* is equal to or greater than the threshold value ("down state"), the display determination unit 31*dt* displays the auxiliary image 27*b* on the touch panel 21*a*, in which the operation button 20B3 which indicates an operation function identical to that of the operation button 20B1 and the operation button 20B4*b* which indicates an operation function identical to that of an operation button 20B2*ba* are laterally arranged, as shown in FIG. 15B (step S35).

This is because, when the inclination angle of the touch panel 21*a* is equal to or greater than the threshold value ("down" state), the occurrence probability of misoperations is higher during the operations by a user of average height than during the operations by a user of small height, and the user of average height tends to unconsciously touch the lower side of the recognition region 20K1 of the operation button 20B1, which is shifted upward from the operation button 20B2*b*, and thus it is very likely that the operation button 20B2*b* is the operation button aimed by the user.

Then, the operation display control unit 31*d* determines whether the operation button displayed in the auxiliary image 27*a* or 27*b* is selected by the user (step S36). If the user touches the operation button 20B displayed in the auxiliary image 27*a* or 27*b*, the operation function of the operation button 20B is executed (step S37), and then counting of the number of repetitions is continued after returning to step S31. On the other hand, if the cancel button CB is pressed, the auxiliary image 27 is deleted (step S38), and then counting of the number of repetitions is continued after returning to step S31.

It should be noted that the auxiliary display determination unit 31*dt* does not display the auxiliary image 27 when the touch operation to the operation button 20B, which is not provided with another operation button 20B located upper-next thereto, and the operation canceling the touch operation are repeated, even if the inclination angle of the touch panel 21*a* is smaller than the threshold value. Moreover, the auxiliary display determination unit 31*dt* does not display the auxiliary image 27 if there is not another operation button 20B located lower-next to the operation button 20B, even if the inclination angle of the touch panel 21*a* is equal to or greater than the threshold value.

In addition, the auxiliary display determination unit 31*dt* does not display the auxiliary image 27 if the touch operation to the operation button 20B which is not provided with another operation button 20B located upper-next thereto, such as an operation button 20B whose operation function is "enlarge" as shown in FIG. 14A, and the operation canceling the touch operation are repeated, and if the inclination angle of the touch panel 21*a* is set in the "default state", because an operation button 20B which is estimated to have been aimed based on the inclination angle does not exist.

A similar situation occurs in the case of the operation button 20B which is not provided with another operation button 20B located lower-next thereto when the inclination angle of the touch panel 21*a* is set in the "down state".

According to the fourth embodiment, the operation display control unit 31*d* detects that an operation assistance for a user is necessary based on the number of repetitions of the touch operations applied to the operation button 20B1 ("equiscale") and canceling operations canceling these operations. In addition, it is determined, based on the inclination angle of the touch panel 21*a*, that the operation button 20B aimed by the user is either the operation button 20B2*a* ("enlarge") located upper-next to the operation button 20B1 or the operation button 20B2*b* ("reduce") located lower-next to the operation button 20B1. Furthermore, the operation buttons 20B3 and 20B4 (20B4*a* or 20B4*b*) respectively having the operation functions same as that of the operation button 20B1 and either the operation button 20B2*a* or the operation button 20B2*b* are clearly displayed in the auxiliary image 27 in an alternative manner.

By this configuration, the user can easily re-select either the operation button 20B3 or the operation button 20B4. In this manner, misoperations can be prevented even if the inclination angle of the touch panel 21*a* is not suitable for the user's height.

Moreover, because misoperations may easily occur among the operation buttons 20B adjacent to each other in the vertical direction when the inclination angle of the touch panel 21*a* is inappropriate, the operation buttons 20B3 and 20B4 are displayed in the auxiliary image 27 in a laterally arranged manner. Furthermore, he operation buttons 20B3 and 20B4 are displayed so as to be larger than the operation buttons 20B1 and 20B2.

By this configuration, further misoperations can be prevented during the re-select operations on the auxiliary image 27.

Accordingly, even if the touch panel 21*a* is used in a state in which the inclination angle thereof is not optimized, and misoperations occur due to this, further misoperations can be prevented because the operation button 20B aimed by the user is rationally determined and displayed on the touch panel 21*a* so that the user can reliably select the aimed operation button.

It should be noted that, in the case of the copier 300A, the inclination angle of the touch panel 21*a* is set at one of two stages, i.e., the "default state" and the "down state"; however, multi-stages or a stepless manner may be used. In such a case, an angle sensor or the like must be provided in order to determine whether the inclination angle of the touch panel 21*a* is equal to or greater than the threshold value.

It should be noted that the operation processes and the configurations or combinations of the components disclosed in the above embodiment are merely examples, and these can be modified in accordance with design demands or the like without departing from the scope of the present invention.

For example, in the above embodiment, the touch panel 21*a* is a resistance membrane type; however, instead of this, a touch panel of a surface acoustic wave type may be used.

In addition, the operation canceling the operation applied to the operation button 20B is not necessarily carried out by the clear key C. For example, if the operation key 21*c* includes a cancel key, a stop key, or a return key, such a key may be used. Alternatively, "(operation) clear", "stop", "return", or "cancel" displayed on the touch panel 21*a* as an operation button may be used. Furthermore, the number of repetitions may be counted by combining these configurations.

Moreover, the predetermined number of repetitions may be properly changed in accordance with the environment under which the image formation device is placed or the display contents of the touch panel.

Furthermore, in the above embodiment, the auxiliary image 27 is displayed in a portion of the touch panel 21*a*; however, the auxiliary image 27 may be displayed in the entire display area.

In the above embodiment, the present invention is applied to the copier 300 and 300A; however, the present invention can be applied to various image formation devices or to various apparatuses other than the image formation devices in which a touch panel is used as an operation display device.

Furthermore, in the above embodiment, the touch panel 21*a* and the operation key 21*c* are controlled by the operation display control units 21*d* and 31*d*; however, the operation display control units 21*d* and 31*d* may be omitted by providing the control//function of the operation display control units 21*d* and 3 Id in the main control unit 6.

A fifth embodiment of the present invention will be explained below with reference to the drawings.

Figure 20:
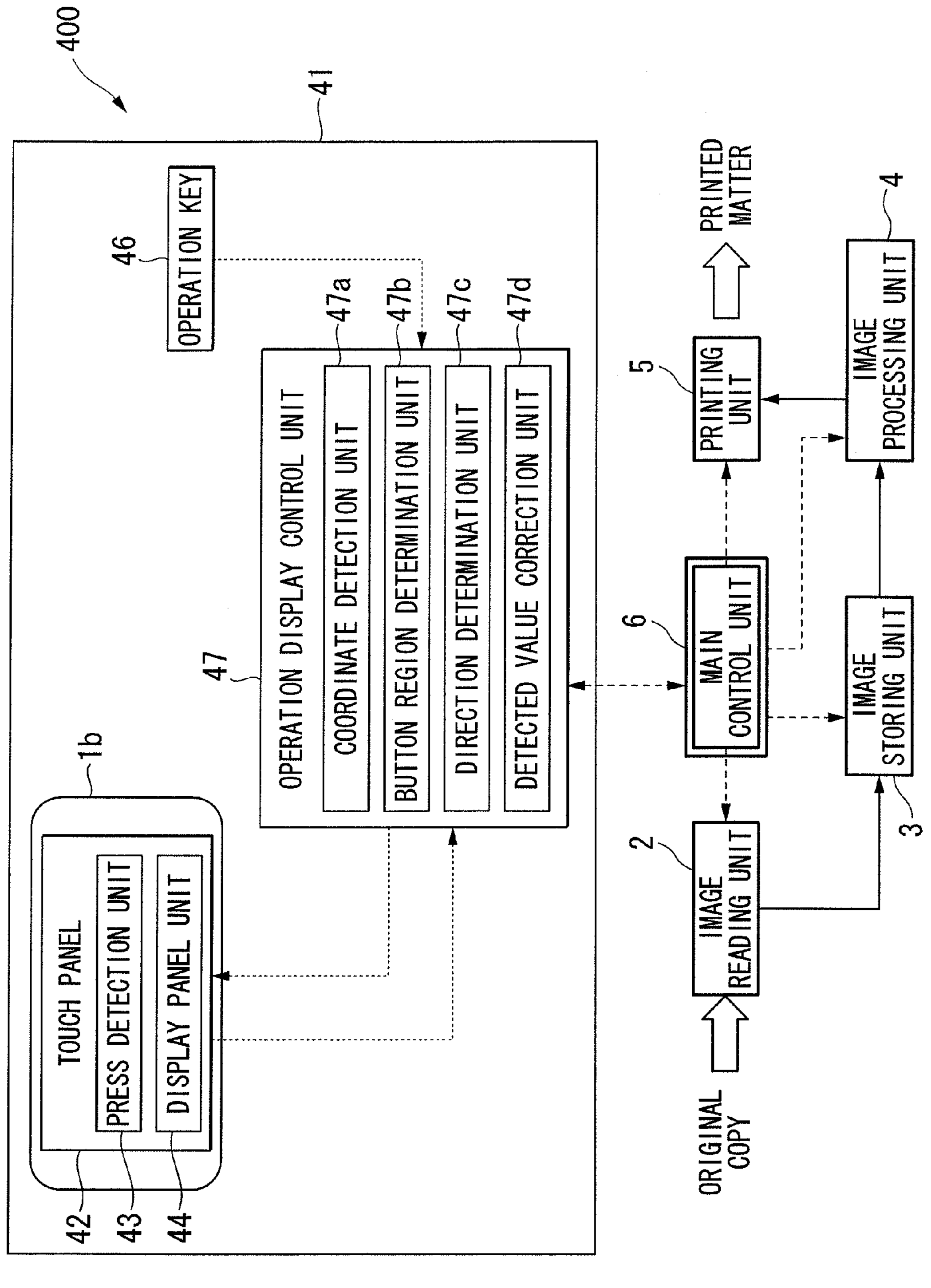
FIG. 20 is a block diagram showing a functional constitution of a copier 400 according to a fifth embodiment of the present invention.

FIG. 20 is a block diagram showing a functional constitution of a copier 400 according to the fifth embodiment of the present invention.

As shown in FIG. 20, the copier 400 includes an operation display unit 41, the image reading unit 2, the image storing unit 3, the image processing unit 4, the printing unit 5, and the main control unit 6. Because the image reading unit 2, the image storing unit 3, the image processing unit 4, the printing unit 5, and the main control unit 6 are identical to that in the first embodiment, a detailed explanation thereof is omitted.

As shown in the figure, the operation display unit 41 includes a touch panel 42, the variable angle support mechanism 1*b*, an operation key 46, and an operation display control unit 47 (which constitutes, with the touch panel 42, a press position detection unit, a button operation detection unit, a button operation appropriateness determination unit, and button operation facilitating unit), and functions as a man-machine interface which links the copier 400 with a user.

The touch panel 42 is integrally composed of a touch detection unit 43 and a display panel unit 44.

The touch detection unit 43, in which an analog resistance film detection method is used for detecting the coordinates of press positions (touch positions), outputs analog voltage signals (Vx, Vy) indicating the X and Y coordinates of a press position to the operation display control unit 47.

Figure 21:
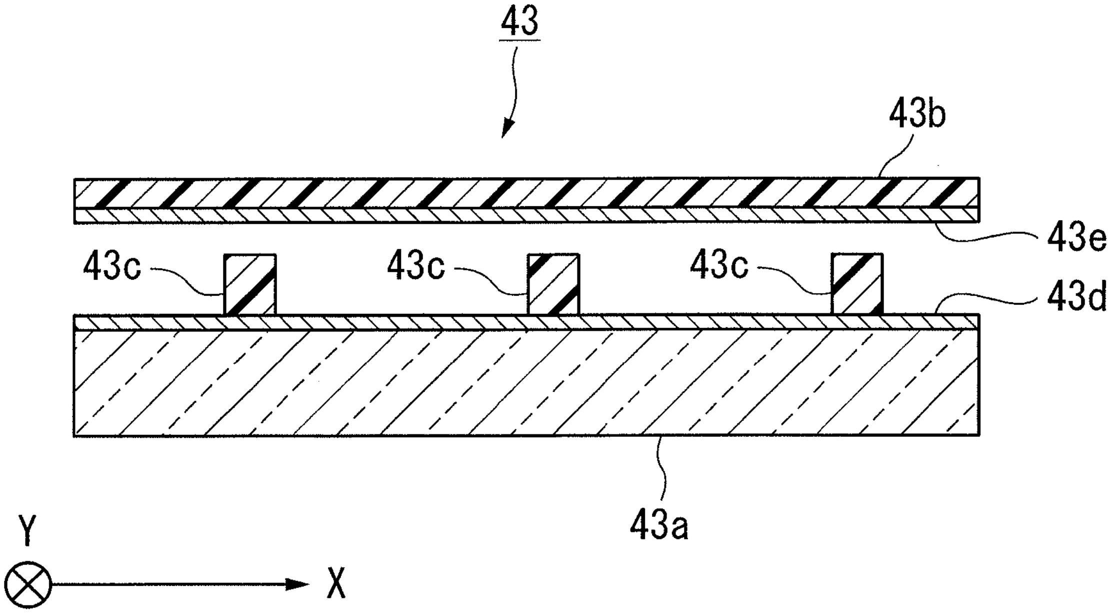
FIG. 21 is a cross-sectional view of a touch detection unit 43.

FIG. 21 is a cross-sectional view of the touch detection unit 43. As shown in FIG. 21, the touch detection unit 43 includes a lower glass substrate 42*a*, an upper film 43*b* having translucency and disposed on the lower glass substrate 42*a*, and spacers 43*c* sandwiched therebetween. The lower glass substrate 42*a* and the upper film 43*b* are respectively provided with, on the opposing surfaces thereof, transparent electrode layer 43*d* and 43*e* made of ITO or the like.

When a user presses the upper film 43*b* in the touch detection unit 43 configured as described above, the transparent electrode layer 43*e* provided on upper film 43*b* contacts the transparent electrode layer 43*d* provided on the lower glass substrate 43*a* at a press position.

As shown in FIG. 21, if the lateral direction of the upper film 43*b* is defined as an X axis, and the vertical direction of the lower glass substrate 43*a* is defined as a Y axis, the electric potential generated in the electrode (one of the electrodes provided at the upper and lower ends of the lower glass substrate 43*a*, not shown) when a predetermined voltage is applied between the electrodes (not shown) provided at the right and left ends of the upper film 43*b* is an analog voltage signal Vx indicating the X coordinate of the press position. In addition, the electric potential generated in the electrode (one of the electrodes provided at the right and left ends of the upper film 43*b*, not shown) when a predetermined voltage is applied between the electrodes (not shown) provided at the upper and lower ends of the lower glass substrate 43*a* is an analog voltage signal Vy indicating the Y coordinate of the press position.

It should be noted that a voltage generating unit for generating and applying voltage between the electrodes provided at the right and left ends of the upper film 43*b* and for applying voltage between the electrodes provided at the upper and lower ends of the lower glass substrate 43*a* is not shown in FIG. 21.

The display panel unit 44 is, for example, a liquid crystal panel, and displays an image in accordance with drive signals (scanning signals and data signals) input from the operation display control unit 47.

Figure 22A:
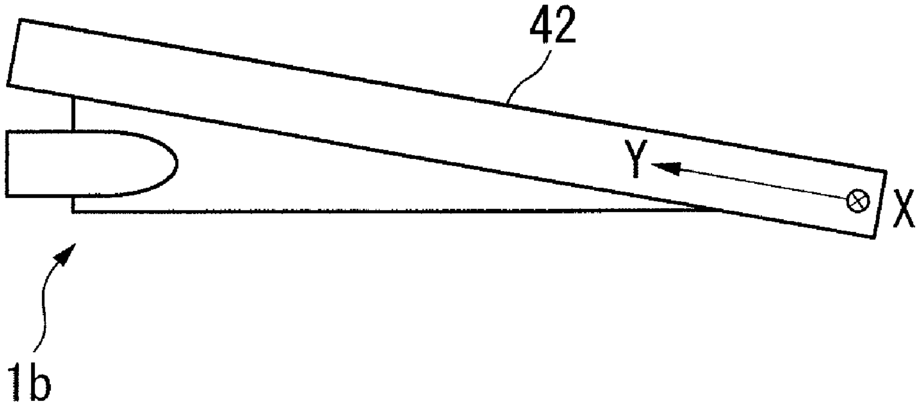
FIGS. 22A and 22B are schematic diagrams showing inclination angle set states of a touch panel 42 set by the variable support mechanism 1*b*, in particular.
Figure 22B:
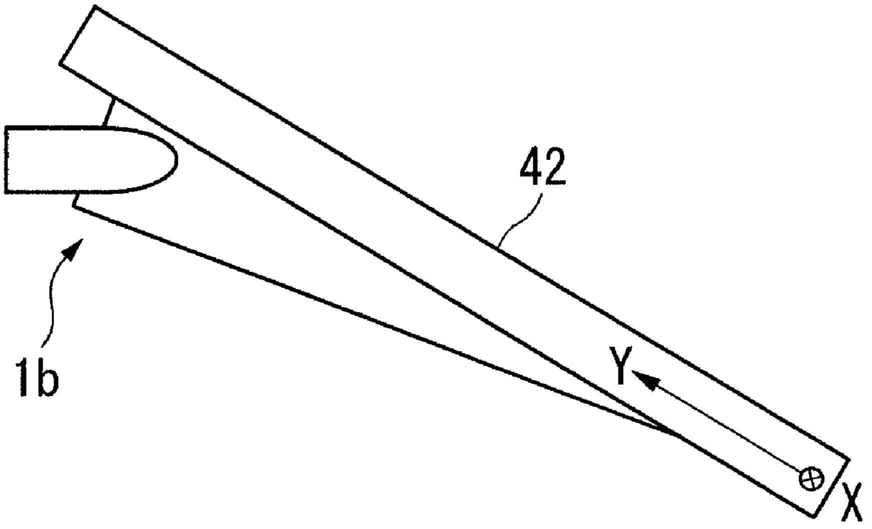

FIGS. 22A and 22B are schematic diagrams showing inclination angle set states of a touch panel 1*a* set by the variable angle support mechanism 1*b*.

The variable angle support mechanism 1*b* (an angle adjusting unit, a button operation facilitating unit) is a mechanism supporting the touch panel 42 while allowing the inclination angle thereof to be freely changed. The variable angle support mechanism 1*b* variably sets the inclination angle of the touch panel 42 in a "default" state shown in FIG. 22A and in a "down" state shown in FIG. 22B by rotatably supporting axes provided on both side faces of the touch panel 42. The "default" state is an inclination angle set state in which the inclination angle of the touch panel 42 is set at a small angle so as to allow a user of average height to easily operate the operation face (display face) of the touch panel 42, and the "down" state is an inclination angle set state in which the inclination angle of the touch panel 42 is set at a large angle so as to allow a user of a height smaller than the average height to easily operate the operation face.

The operation key 46 is an operation key (a hardware key) such as a clear key canceling operation functions, a power button, or a copy start button, other than the operation buttons 30B displayed on the touch panel 42 (the display panel unit 44). The operation buttons 30B displayed on the touch panel 42 are displayed on the display panel by way of software based on a predetermined program stored in the internal memory of the operation display control unit 47. On the other hand, the operation key 46 is physically provided as a hardware key, and outputs operation signals based on the operation by a user to the operation display control unit 47.

The operation display control unit 47 is a control device which controls the touch panel 42 and the operation key 46 under control by the main control unit 6, and includes an MPU (Micro Processing Unit), an internal memory, and interface circuits which exchange various signals with the touch panel 42, the operation key 46, and the main control unit 6.

The operation display control unit 47 transmits signals based on the operation display control of the touch panel 42 and commands of a user to the main control unit 6, based on an operation display control program stored in the internal memory thereof, analog voltage signals input from the touch detection unit 43, operation signals input from the operation key 46, control commands input from the main control unit 6, and setting information of various regions (to be separately described below).

Figure 23:
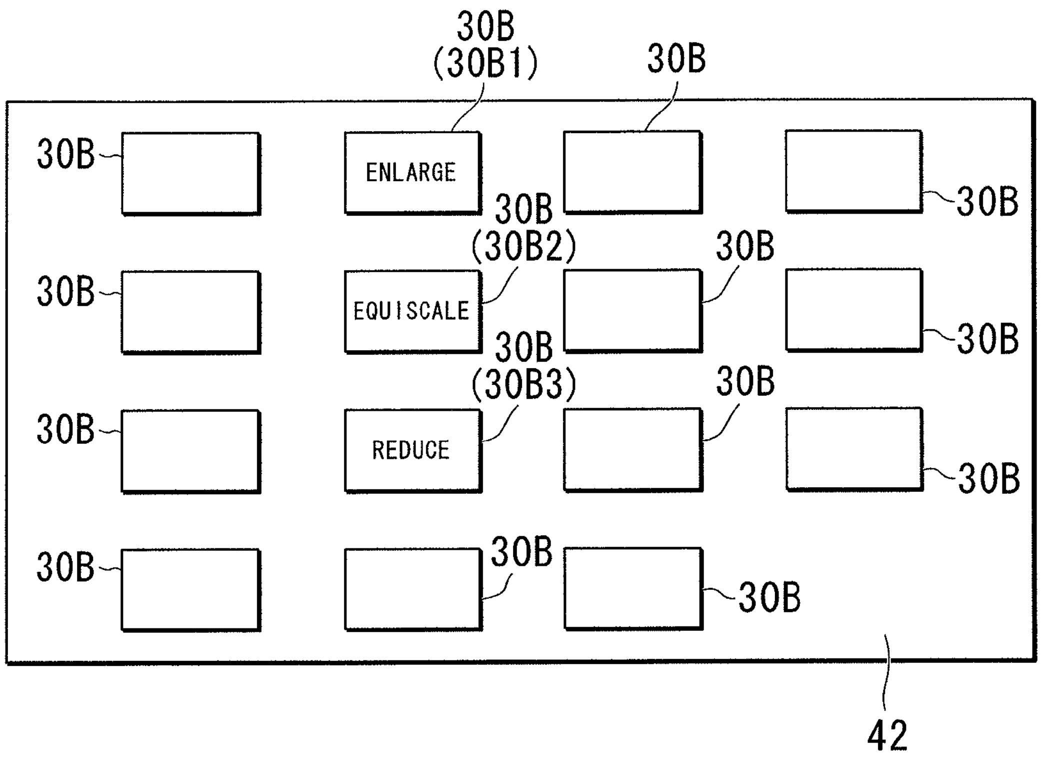
FIG. 23 is a schematic diagram showing operation buttons 30B displayed on the touch panel 42.

FIG. 23 is a schematic diagram showing the operation buttons 30B displayed on the touch panel 42 (the display panel unit 44).

The operation display control unit 47 sets types and layout of the operation buttons 30B to be displayed on the touch panel 42 based on the control commands input from the main control unit 6.

FIG. 23 is an example of a layout of the operation buttons 30B displayed on the touch panel 21*a*. Because the number of the operation buttons 30B to be displayed is comparatively great, only a limited space is provided between adjacent operation buttons 30B. In addition, because the operation buttons 30B are comparatively small, misoperations between the adjacent operation buttons 30B are easy to occur, in particular, if the inclination angle of the touch panel 42 is inappropriate for a user, misoperations between the adjacent operation buttons 30B disposed in the longitudinal direction are easy to occur.

Furthermore, the operation display control unit 47 includes a coordinate detection unit 47*a*, a button range determination 47*b*, a direction determination unit 47*c*, and a detected value correction unit 47*d*.

Figure 24:
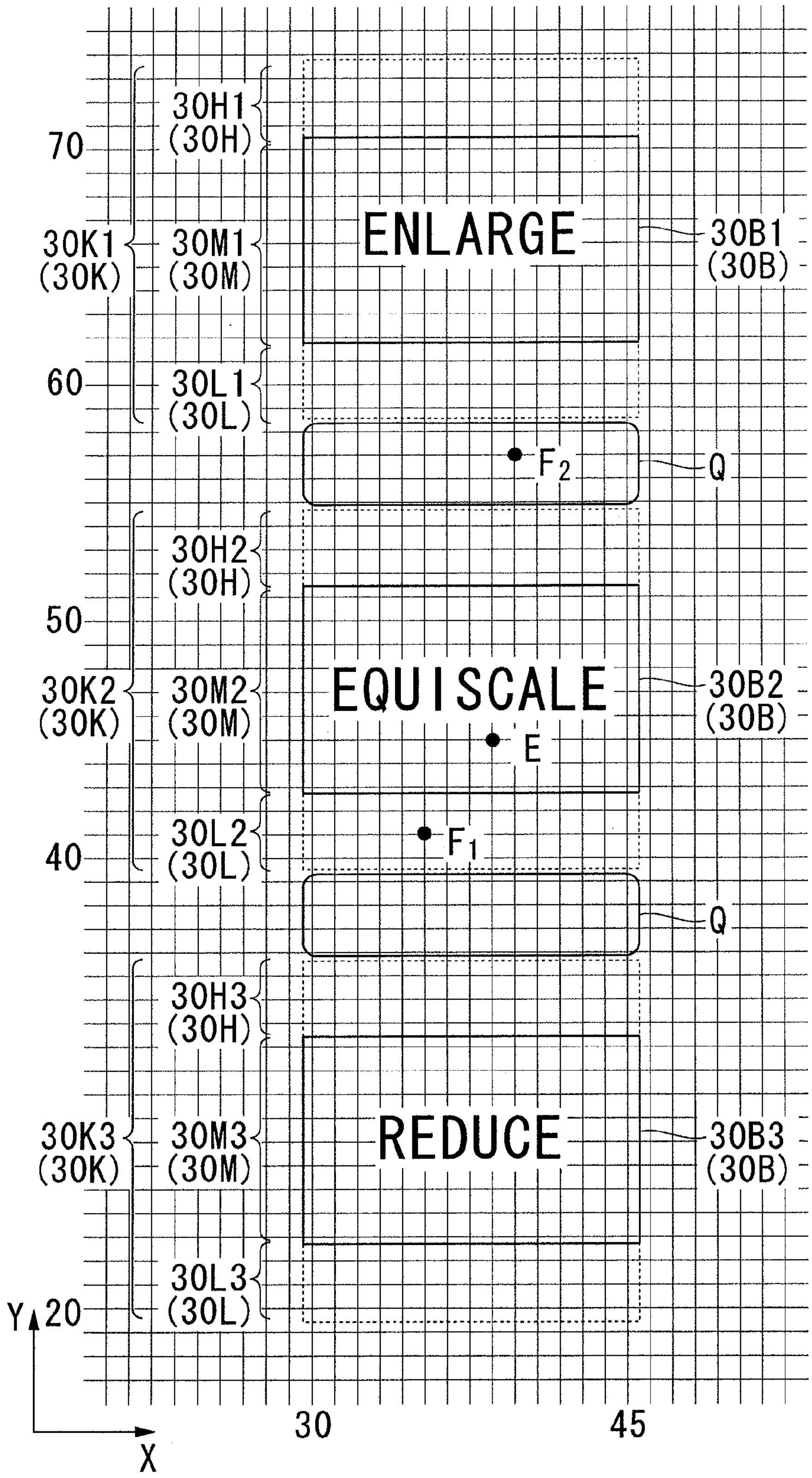
FIG. 24 is a conceptional diagram showing the relationship between the operation buttons 30B and the recognition regions 30K and a coordinate system.

The coordinate detection unit 47*a* carries out analog-to-digital conversion on the analog voltage signals (Vx, Vy) indicating the X and Y coordinates so as to obtain a voltage value indicating the X coordinate and a voltage value indicating the Y coordinate. The coordinate detection unit 47*a* detects the X and Y coordinates of the press position (hereinafter referred to as press coordinates (X.sub.0, Y.sub.0)) based on the relationship between the X coordinate and the voltage value and the relationship between the Y coordinate and the voltage value stored in the internal memory in advance. It should be noted that the origin O (0, 0) of this coordinate system is located at the left-bottom of the touch panel 42. FIG. 24 is a partial enlarged view of FIG. 23, and is a conceptional diagram showing the relationship between the operation buttons 30B (30B1, 30B2, 30B3) and the recognition regions 30K (30K1, 30K2, 30K3) and the coordinate system.

As shown in FIG. 24, the operation display control unit 47 sets in advance the recognition regions 30K of various operation buttons 30B displayed on the display panel unit 44.

The operation display control unit 47 sets the button recognition regions 30K which include the regions (display corresponding regions 30M (30M1, 30M2, 30M3)) overlapping the display of the operation buttons 30B, as well as the regions upper-next to and lower-next to the display corresponding regions 30M. In addition, in the recognition regions 30K (30K1, 30K2, 30K3) excluding the display corresponding regions 30M (30M1, 30M2, 30M3), the upper side regions are designated as upper regions 30H (30H1, 30H2, 30H3), and the lower side regions are designated as lower regions 30L (30L1, 30L2, 30L3), which separately contribute to recognition, respectively. More specifically, when a touch is applied to the display corresponding regions 30M, the upper region 30H, or the lower region 30L, operation signals corresponding to the operation functions allocated to the operation button 30B are output to the main control unit 6. In the present embodiment, the upper regions 30H are located farther than the display corresponding regions 30M from a user operating the touch panel 42, and the lower regions 30L are located closer than the display corresponding regions 30M to the user.

Furthermore, the operation display control unit 47 sets the regions (non-recognition regions) between the recognition regions adjacent to each other in the Y direction as corrective regions Q. The press coordinates (X.sub.0, Y.sub.0) within the corrective regions Q are corrected so as to be within the display corresponding regions 30M during the correction mode which will be separately described.

It should be noted that such setting information is stored in the internal memory of the operation display control unit 47 in advance.

When it is determined that the press coordinates (touch position detection values) coincide with the coordinates within the recognition regions 30K, the button range determination 47*b* determines that an operation is applied to the corresponding operation button 30B.

More specifically, when the press coordinates (X.sub.0, Y.sub.0) is detected (or corrected coordinates (X.sub.1, Y.sub.1) to be described below), it is determined which recognition region 30K of the operation button 30B the press coordinates (X.sub.0, Y.sub.0) fall within. When it is determined that the press coordinates (X.sub.0, Y.sub.0) fall within any one of the recognition regions 30K, it is determined that a touch operation is applied to the corresponding operation button 30B, then, based on the operation function allocated thereto, the drive signals of the operation function are output to the display panel unit 44, and the operation signals of the operation function are output to the main control unit 6.

For example, as shown in FIG. 24, when the press coordinates (X.sub.0, Y.sub.0)=(38, 45) of a press E are detected, it is determined that the press E coincides with the coordinates within the recognition region 30K2 because the X coordinate of the recognition region 30K2 of the operation button 30B2 is in a range of 30 to 45, and the Y coordinate thereof is in a range of 40 to 54, and it is determined that an operation is applied to the operation button 30B2. At this moment, the operation display control unit 47 outputs the operation signals corresponding to the operation function "equiscale" of the operation button 30B2 to the main control unit 6.

On the other hand, when it is determined that the press coordinates (X.sub.0, Y.sub.0) fall within coordinate range of none of the recognition regions 30K, the operation display control unit 47 does not output the operation signals corresponding to the operation function of the operation buttons 30B.

When the press position for the operation button 30B tends to shift in a certain direction, the direction determination unit 47*c* determines the direction to be a touch position shift direction.

More specifically, it is determined whether the ratio of the number of presses applied to the upper regions 30H or to the lower regions 30L with respect to the total number of presses applied to the operation buttons 30B over a predetermined period exceeds a predetermined ratio stored in advance in the internal memory. When it is determined that the number of the presses applied to the upper regions 30H exceeds the predetermined ratio, +Y direction is determined to be the touch position shift direction. On the other hand, when it is determined that the number of presses applied to the lower regions 30L exceeds the predetermined ratio, −Y direction is determined to be the touch position shift direction.

It should be noted that, in the fifth embodiment, touch position shift on the X direction is not considered.

When the touch position shift direction is determined by the direction determination unit 47*c*, the operation display control unit 47 sets a correction mode corresponding to the touch position shift direction. A correction mode I is set as the correction mode when the touch position shift direction is −Y direction, and a correction mode II is set when the touch position shift direction is +Y direction.

The detected value correction unit 47*d* calculates, according to the correction mode I or II, correction coordinates (X.sub.1, Y.sub.1) so as to be within the display corresponding region 30M located at upper-next or lower-next position by adding a correction value .alpha. to the press coordinates (X.sub.0, Y.sub.0) detected in the corrective region Q.

More specifically, when the correction mode I is set, the detected value correction unit 47*d* corrects the press coordinates (X.sub.0, Y.sub.0) detected in the corrective region Q by adding a correction value .alpha. to the Y coordinate (Y.sub.0) so as to be within the display corresponding region 30M located in the +Y direction with respect to the press coordinates (opposite direction of the touch position shift direction), i.e., (X.sub.1, Y.sub.1)=(X.sub.0, Y.sub.0+.alpha.).

Moreover, when the correction mode II is set, the detected value correction unit 47*d* corrects the press coordinates (X.sub.0, Y.sub.0) detected in the corrective region Q by adding a correction value .alpha. to the Y coordinate (Y.sub.0) so as to be within the display corresponding region 30M located in the −Y direction with respect to the press coordinates (opposite direction of the touch position shift direction), i.e., (X.sub.1, Y.sub.1)=(X.sub.0, Y.sub.0+.alpha.).

The correction value .alpha. is determined by subtracting the Y coordinate (Y.sub.0) of the press coordinates from the Y coordinate of the middle of each display corresponding region 30M so that the Y coordinate (Y.sub.1) after correction is located at the middle of the display corresponding region 30M.

In addition, the button range determination 47*b* determines whether the corrected coordinates (X.sub.1, Y.sub.1) after correction coincide with the coordinates within any one of the recognition region 30K.

Figure 25:
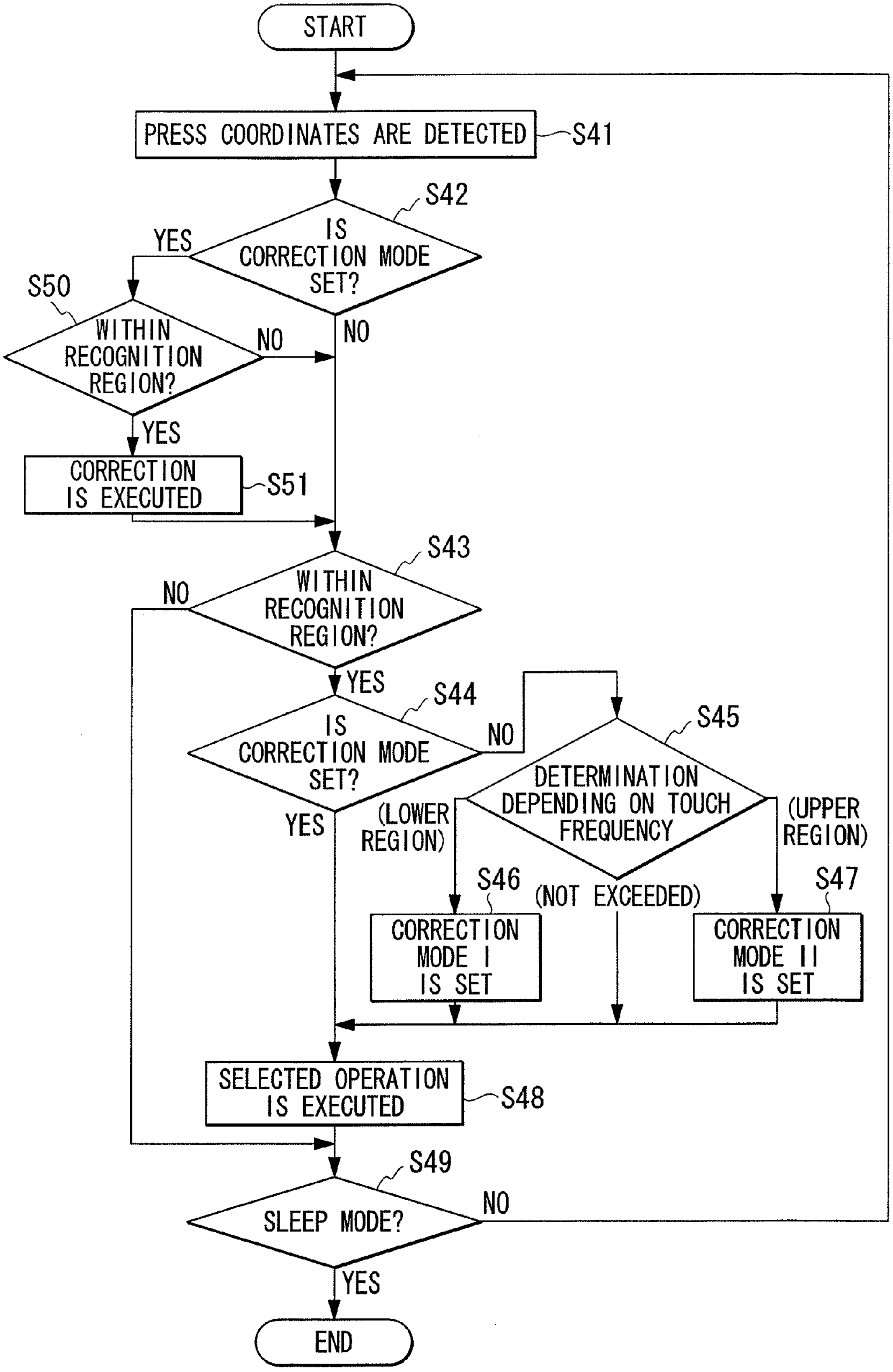
FIG. 25 is a flowchart showing the operation of the primary portion of the copier 400.

Next, the operation of the primary portion of the copier 400 will be explained in details with reference to the flowchart shown in FIG. 25. The flowchart only indicates a portion (primary portion) particularly relating to the present invention among various processes to be executed by the operation display control unit 47 (more specifically, the MPU of the display control unit 47) based on an operation display control program.

In the following description, it is assumed that the correction mode is not set.

First, when a press is applied to the touch panel 42, the operation display control unit 47 detects the press coordinates (X.sub.0, Y.sub.0) by the coordinate detection unit 47*a* (step S41). For example, when a press F.sub.1 is applied to the lower region 30L2 of the operation button 30B2 (see FIG. 24), a press coordinates (35, 41) is detected.

Next, the operation display control unit 47 determines whether the correction mode is set (step S42). If the correction mode is not set, it is determined "No" in step S42, and the process proceeds to step S43.

In step S43, it is determined by the button range determination 47*b* whether the press coordinates (X.sub.0, Y.sub.0) fall within the recognition region 30M of any one of the operation buttons 30B. For example, in the case of the press F.sub.1, it is determined that the press coordinates (X.sub.0, Y.sub.0)=(35, 41) coincide the coordinates (30-45, 40-54) within the recognition region 30K2, and thus an operation is applied to the operation button 30B2.

It should be noted that when the determination in step S43 is "No", the process proceeds to step S49 which will be separately described below.

When the determination in step S43 is "Yes", the operation display control unit 47 again determines whether the correction mode is set (step S44). The reason whether the correction mode is set is again determined is that, if the correction mode is already set, it is not necessary to further carry out the processes to set the correction mode.

If the correction mode is set, the operation function of the operation button to which an operation is applied, which is determined in step S43, is carried out (step S48).

On the other hand, if the correction mode is not set, the determination in step S44 is "No", the process proceeds to step S45 in which it is determined whether the correction mode is to be set.

As described above, in step S45, it is determined by the direction determination unit 47*c* whether the ratio of the number of presses applied to the upper region 3011 and to the lower region 30L with respect to the total number of presses applied to the recognition region 30K over a predetermined period T exceeds a predetermined ratio stored in advance in the internal memory.

In fifth embodiment, the predetermined ratio over the predetermined period T is set to be 40%.

For example, it is assumed that, within the predetermined period T, the total number of press operations is 19 times before the press F.sub.1 is applied, the number of press operations applied to the upper region 30H is 2 times, the number of press operations applied to the display corresponding region 30M is 9 times, and the number of press operations applied to the lower region 30L is 8 times. If the press F.sub.1 is applied to the lower region 30L, the number of press operations applied to the lower region 30L is 9 times, the total number of press operations is 20 times, and the ratio of the lower region 30L is 9/20 (45%), which is determined to have exceeded the predetermined ratio.

As described, when it is determined in step S45 that the ratio of the number of presses applied to the lower region 30L exceeds the predetermined ratio, the direction determination unit 47*c* determines the touch position shift direction to be the −Y direction, and the operation display control unit 47 sets the correction mode I (step S46).

On the other hand, when it is determined that the ratio of the number of presses applied to the upper region 3011 exceeds the predetermined ratio, the direction determination unit 47*c* determines the touch position shift direction to be the +Y direction, and the operation display control unit 47 sets the correction mode II (step S47).

In addition, when none of the ratio of the number of presses applied to the upper region 30H and the lower region 30L exceeds the predetermined ratio, the correction mode is not set.

After it is determined in step S45 that none of the ratio of the number of presses applied to the upper region 30H and the lower region 30L exceeds the predetermined ratio, or after the correction mode is set in step S46 or S47, the operation function of the operation button 30B to which an operation is applied, which is determined in step S43, (e.g., "equiscale" in the case of the operation button 30B2) is carried out (step S48).

Then, it is determined whether a sleep state is set after a predetermined time is passed (step S49). When the determination in step S49 is "No", the process returns to step S41 if the next press is applied within a predetermined period. on the other hand, when the determination in step S49 is "Yes", the correction mode, if it has been set, is canceled, and the process is terminated.

Next, the case, in which, through the above processes, the correction mode I is set in step S46, and process returns from step S49 to step S41, will be explained.

First, in step S41, when a press is applied to the touch panel 42, the press coordinates (X.sub.0, Y.sub.0), e.g., press coordinates (41, 57) in the case of the press F.sub.2, are detected (see FIG. 24).

In step S42, because the correction mode is set, the determination is "No", and the process proceeds to step S50.

In step S50, it is determined whether the detected press coordinates (X.sub.0, Y.sub.0) fall within the corrective region Q. For example, in the case of the press F.sub.2 whose press coordinates (X.sub.0, Y.sub.0)=(41, 57) fall within the corrective region Q; therefore, the process proceeds to step S51.

When the determination in step S50 is "Yes", the correction value .alpha. is added to the Y coordinate of the detected press coordinates (X.sub.0, Y.sub.0) so as to obtain the corrected coordinates (X.sub.1, Y.sub.1) (step S51). For example, if the correction mode I is set, and the press coordinates of the press F.sub.2 (X.sub.0, Y.sub.0)=(41, 57), the correction value .alpha. is "9" which is obtained by subtracting the Y coordinate "57" of the detected press coordinates from the middle Y coordinate "66" of the display corresponding region 30M located in the +Y direction (opposite direction of the touch position shift direction). That is, the corrected coordinates (X.sub.0, Y.sub.0+9)=(41, 66) are obtained by adding correction value "9" to the Y coordinate (Y.sub.0).

After correcting the press coordinates (X.sub.0, Y.sub.0) in step S51, it is determined whether the corrected coordinates (X.sub.1, Y.sub.1) fall within the recognition region 30K (step S43). As described above, because the corrected coordinates (X.sub.1, Y.sub.1) are obtained so as to fall within the display corresponding region 30M, it is determined that they fall within the recognition region 30K located at an upper position when the correction mode I is set, and it is determined that they fall within the recognition region 30K located at a lower position when the correction mode II is set. For example, in the case of the press F.sub.2 when the correction mode I is set, it is determined that the corrected coordinates (X.sub.1, Y.sub.1) fall within the display corresponding region 30M1

(the recognition region 30K1), and it is determined that an operation is applied to the operation button 30B1.

When it is determined "Yes" in step S43, the process proceeds to step S44. Furthermore, after it is determined "Yes" in step S44, the process proceeds to step S48. In step S48, the operation function of the operation button 30B located upper-next to or lower-next to the corrective region Q is carried out. For example, in the case of the press F.sub.2 when the correction mode I is set, the operation function "enlarge" of the operation button 30B1 is carried out.

Then, in step S49, if it is determined that the next press operation is applied within a predetermined period, the process returns to step S41 while maintaining the correction mode, and if it is determined that the next press operation is not applied within the predetermined period, the correction mode is canceled, and the process is terminated.

It should be noted that when the determination in step S50 is "No", it is determined whether the press coordinates (XO, YO) fall within any one of the recognition regions 30K (step S43), and when the determination in step S43 is "Yes", the process proceeds to step S44 in which it is also determined "Yes" because the correction mode is set, and the operation function of the operation button 30B2 is carried out (step S48). After it is determined "No" in step S43, or after the operation function is carried out in step S48, the process proceeds to step S49.

According to the fifth embodiment, first, the direction determination unit 47*c* determines the touch position shift direction for the display corresponding region 30M based on the position of the touch operation applied to the upper region 30H and the lower region 30L within the recognition region 30K. Then, a correction value .alpha. is added to the Y coordinate so that the press coordinates (X.sub.0, Y.sub.0) detected in the corrective region Q fall within the recognition region 30K of the operation button 30B located at an opposite position with respect to the touch position shift direction.

By these processes, if the touch position of a user is shifted, and even if a touch operation by the user is erroneously applied to a neutral region (corrective region Q) between two recognition regions 30K of the operation buttons 30B adjacent to each other, the operation function of the operation button 30B supposed to be aimed by the user can be carried out based on the corrected coordinates (X.sub.1, Y.sub.1) obtained by correction.

In other words, even if the touch position of a user is shifted due to inappropriate inclination angle of the touch panel 42 for the user (e.g., when a user of a small height operates the touch panel 42 while the touch panel is placed in the "default" state), the user's operations are assisted by correcting the press coordinates, the user can comfortably operates the image formation device.

It should be noted that the case of correction mode I is explained as an example I the above description; however, similar processes are applied to the correction mode II. More specifically, when the number of presses applied to the upper region 30L exceeds the predetermined ratio, and press coordinates (X.sub.0, Y.sub.0) within the corrective region Q are detected, a correction value .alpha. is added to the Y coordinate of the press coordinates (X.sub.0, Y.sub.0) so that the corrected coordinates (X.sub.1, Y.sub.1) fall within the display corresponding region 30M which is located closest from the press coordinates (X.sub.0, Y.sub.0) in the −Y direction.

Accordingly, misoperations can be prevented by assisting a user of large height when the touch panel 42 is, in particular, placed in the "down state".

It should be noted that the operation processes and the configurations or combinations of the components disclosed in the above embodiment are merely examples, and these can be modified in accordance with design demands or the like without departing from the scope of the present invention.

For example, in the above embodiment, the touch detection unit 43 of a resistance membrane type is described; however, instead of this, a touch detection unit of a surface acoustic wave type may be used.

In the above embodiment, the corrective region Q is defined as a region between two recognition regions 30K; however, the corrective region Q may be expanded so as to include, partially or entirely, the upper region 30H and the lower region 30L of the adjacent operation button 30B. More specifically, the corrective region Q may be expanded so as to include, partially or entirely, the upper region 30H of the operation button 30B located lower-next thereto (e.g., the upper regions 30H2 and 30H3 of the operation buttons 30B2 and 30B3 shown in FIG. 24) in the case of correction mode I, and may be expanded so as to include, partially or entirely, the lower region 30L of the operation button 30B located upper-next thereto (e.g., the lower regions 30L1 and 30L2 of the operation buttons 30B1 and 30B2 shown in FIG. 24) in the case of correction mode II. According to this configuration, even if a user touches the upper region 30H of the operation button 30B located upper-next to the operation button 30B aimed by the user, of even if a user touches the lower region 30L of the operation button 30B located lower-next to the operation button 30B aimed by the user, misoperations can be avoided.

Similarly, the corrective regions Q may be further provided in the upper region or the lower region of the recognition region 30K of the operation button 30B (e.g., operation button 30B1 shown in FIGS. 23 and 24) which is not provided with another operation button 30B located upper-next or lower-next thereto.

Moreover, in the above embodiment, the correction value .alpha. is calculated using the Y coordinate of the middle of the display corresponding regions 30M; however, another calculation method may be used as long as the corrected coordinates (X.sub.1, Y.sub.1) fall within the display corresponding regions 30M, or a constant value may be used. Furthermore, the corrected coordinates (X.sub.1, Y.sub.1) do not have to fall within the display corresponding regions 30M as long as falling within the recognition region 30K.

In addition, the variable angle support mechanism 1*b* does not have to be provided. In the case of a touch panel in which operation buttons are small, and the spaces between the operation buttons are also small, misoperations tend to easily occur even though the inclination angle is appropriate for the user. Misoperations in such a case may be prevented by the present invention without using the variable angle support mechanism 1*b*.

In the above embodiment, the present invention is applied to the copier 400; however, the present invention can be applied to various image formation devices other than a copier or to various apparatuses in which a touch panel is used as an operation display device.

Furthermore, in the above embodiment, the touch panel 42 and the operation key 46 are controlled by the operation display control unit 47; however, the operation display control unit 47 may be omitted by providing the control function of the operation display control unit 47 in the main control unit 6.

What is claimed is:

1. An operation device comprising:

a touch panel on which at least one operation button is displayed;

a press position detection unit detecting a press position when a user presses the touch panel;

a button operation detection unit determining whether an operation is applied to the operation button based on the press position;

a button operation appropriateness determination unit determining whether a button operation by the user is appropriate; and a button operation facilitating unit facilitating subsequent button operations by the user when it is determined by the button operation appropriateness determination unit that the button operation by the user is inappropriate;

wherein the button operation detection unit comprises an operation counting unit which counts the number of repetitions of press operations applied to a first operation button which is one of the operation buttons and canceling operations canceling the press operations applied to the first operation button;

the button operation appropriateness determination unit determines that the button operation by the user is inappropriate when the number of repetitions counted by the operation counting unit reaches a predetermined number of repetitions; and the button operation facilitating unit displays, when it is determined by the button operation appropriateness determination unit that the button operation by the user is inappropriate, an auxiliary image including a third operation button which indicates an operation identical to that of the first operation button, and a fourth operation button which indicates an operation identical to that of at least one second operation button which is disposed next to the first operation button.

2. The operation device according to claim 1, wherein the button operation facilitating unit comprises an auxiliary display determination unit which displays one of the second operation buttons that is disposed upper-next to or lower-next to the first operation button as the fourth operation button.

3. The operation device according to claim 2, wherein the auxiliary display determination unit determines whether the auxiliary image is displayed depending on the press position within a press recognition region where the press operation applied to the first operation button is recognized, and on the number of repetitions.

4. The operation device according to claim 3, wherein the auxiliary display determination unit displays one of the second operation buttons that is disposed upper-next to the first operation button as the fourth operation button when all of the press positions fall within an upper region disposed in an upper area of the press recognition region and/or the auxiliary display determination unit displays one of the second operation buttons that is disposed lower-next to the first operation button as the fourth operation button when all of the press positions fall within a lower region disposed in a lower area of the press recognition region.

5. The operation device according to claim 1, wherein the button operation facilitating unit comprises an auxiliary display determination unit which displays the third operation button and the fourth operation button in a positional relationship which is different from that of the first operation button and the second operation button.

6. The operation device according to claim 1, wherein the button operation facilitating unit comprises an angle adjusting unit which changes an inclination angle of the touch panel.

7. The operation device according to claim 1, wherein the button operation facilitating unit comprises: an angle adjusting unit which changes an inclination angle of the touch panel; an angle measuring unit which measures the inclination angle of the touch panel; and an auxiliary display determination unit which displays the auxiliary image depending on a measurement result of the angle measuring unit.

8. The operation device according to claim 7, wherein the auxiliary display determination unit displays one of the second operation buttons that is disposed upper-next to the first operation button as the fourth operation button when the inclination angle measured by the angle measuring unit is equal to or greater than a predetermined threshold.

9. The operation device according to claim 7, wherein the auxiliary display determination unit displays one of the second operation buttons that is disposed lower-next to the first operation button as the fourth operation button when the inclination angle measured by the angle measuring unit is smaller than a predetermined threshold.

* * * * *